Figure 17:
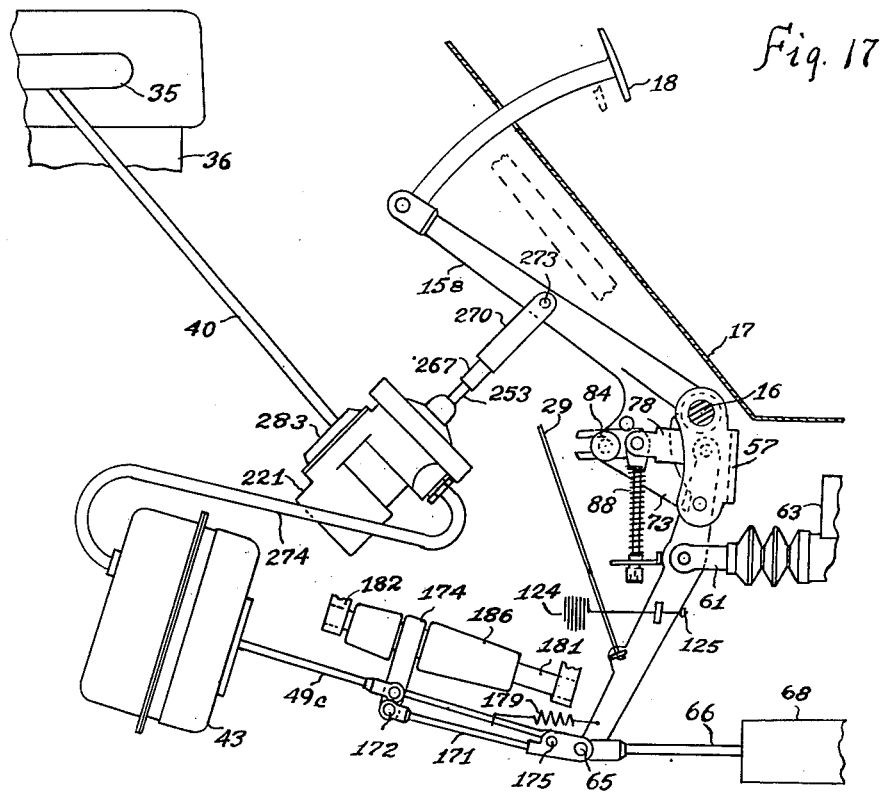

April 3, 1945.  B. H. MOSSINGHOFF  2,372,842
BRAKE OPERATOR
Filed Aug. 16, 1941   6 Sheets-Sheet 1
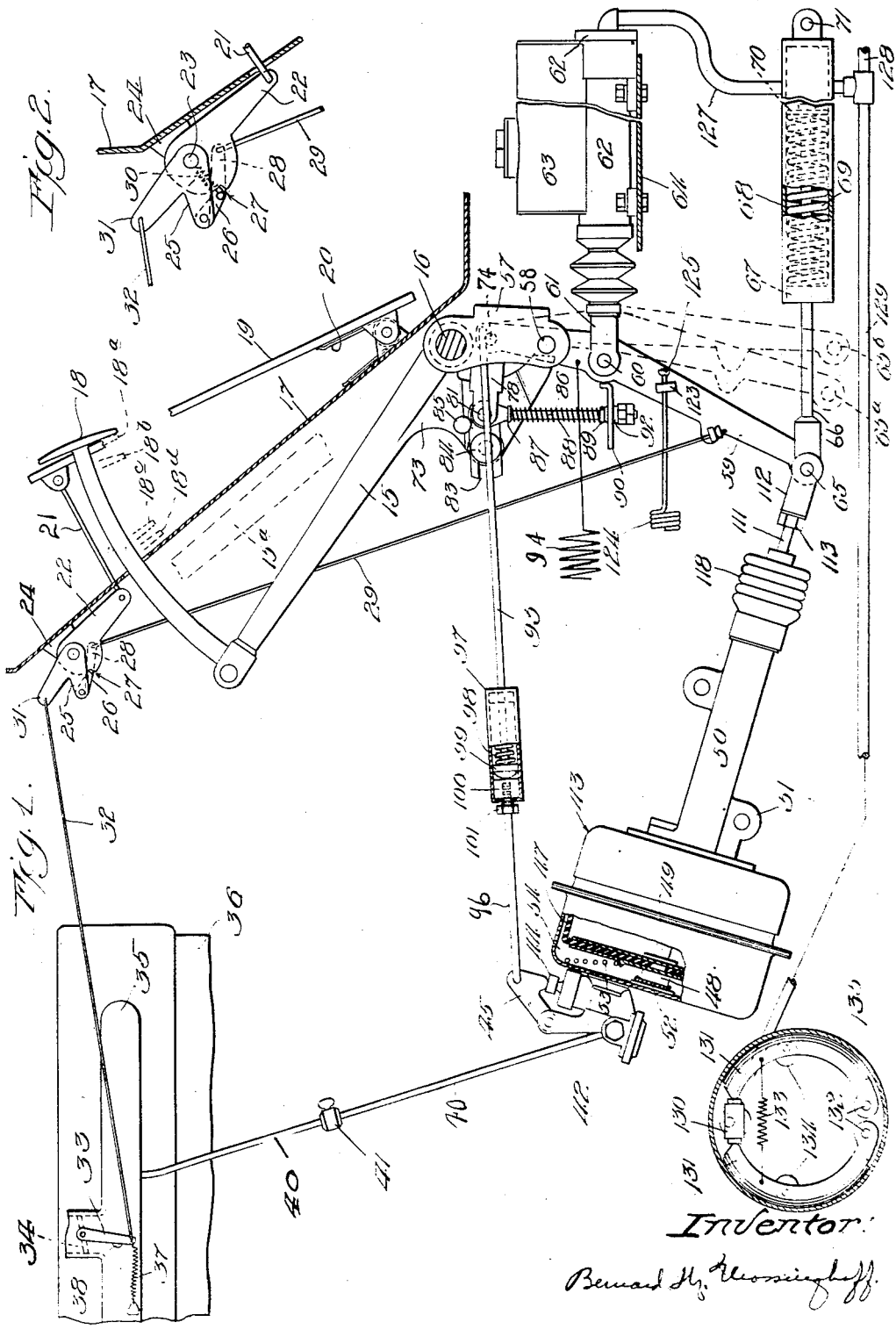
Inventor:
Bernard H. Mossinghoff

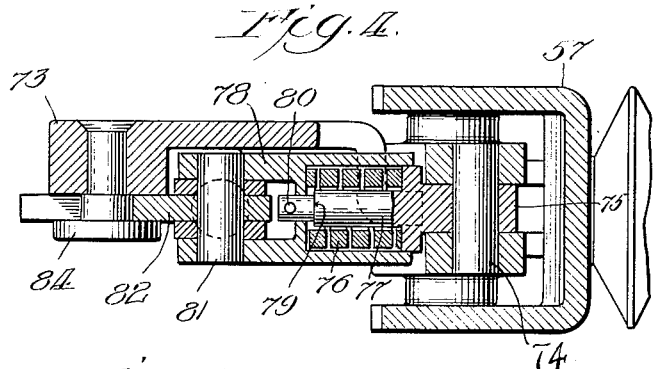
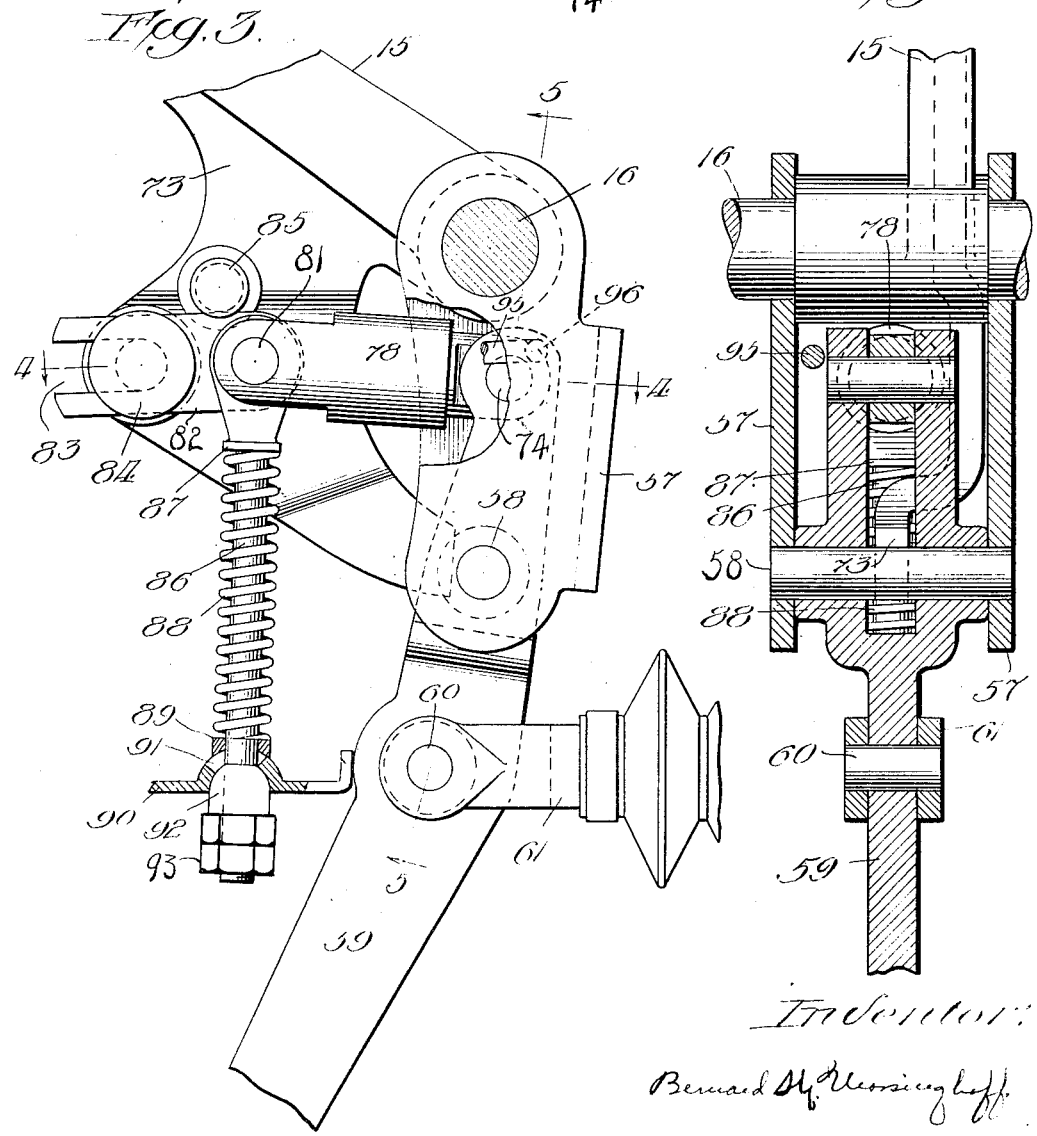

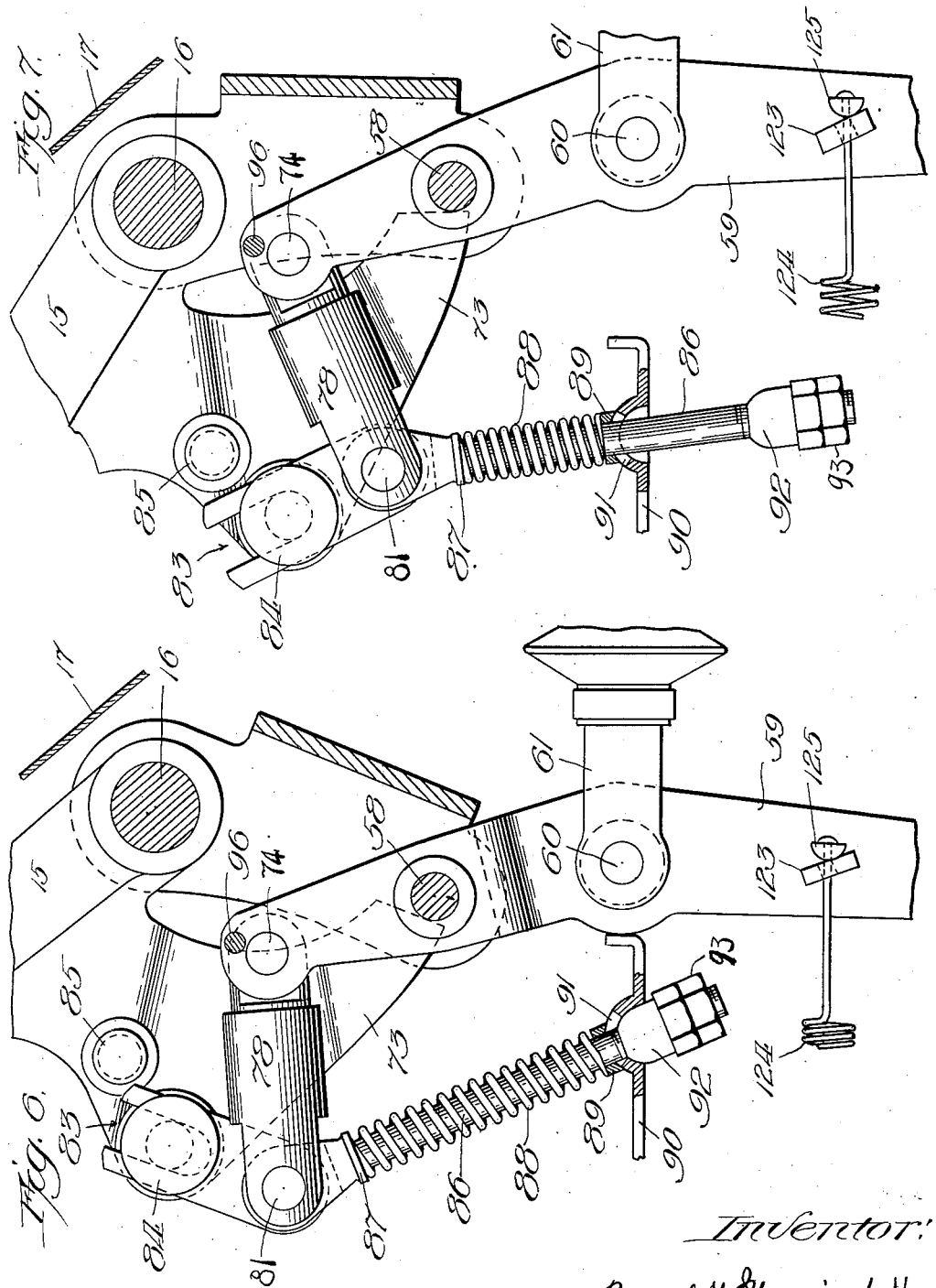

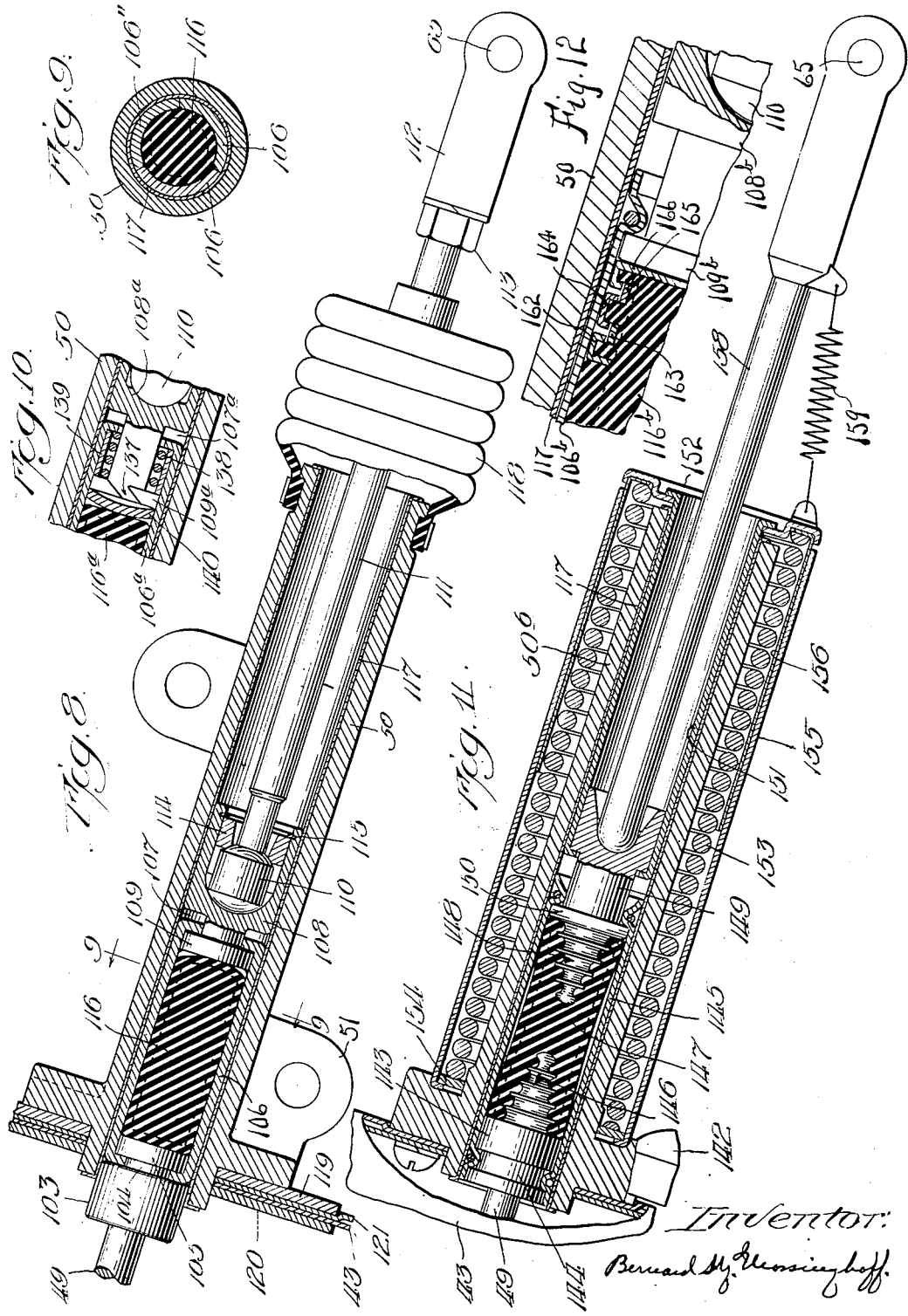

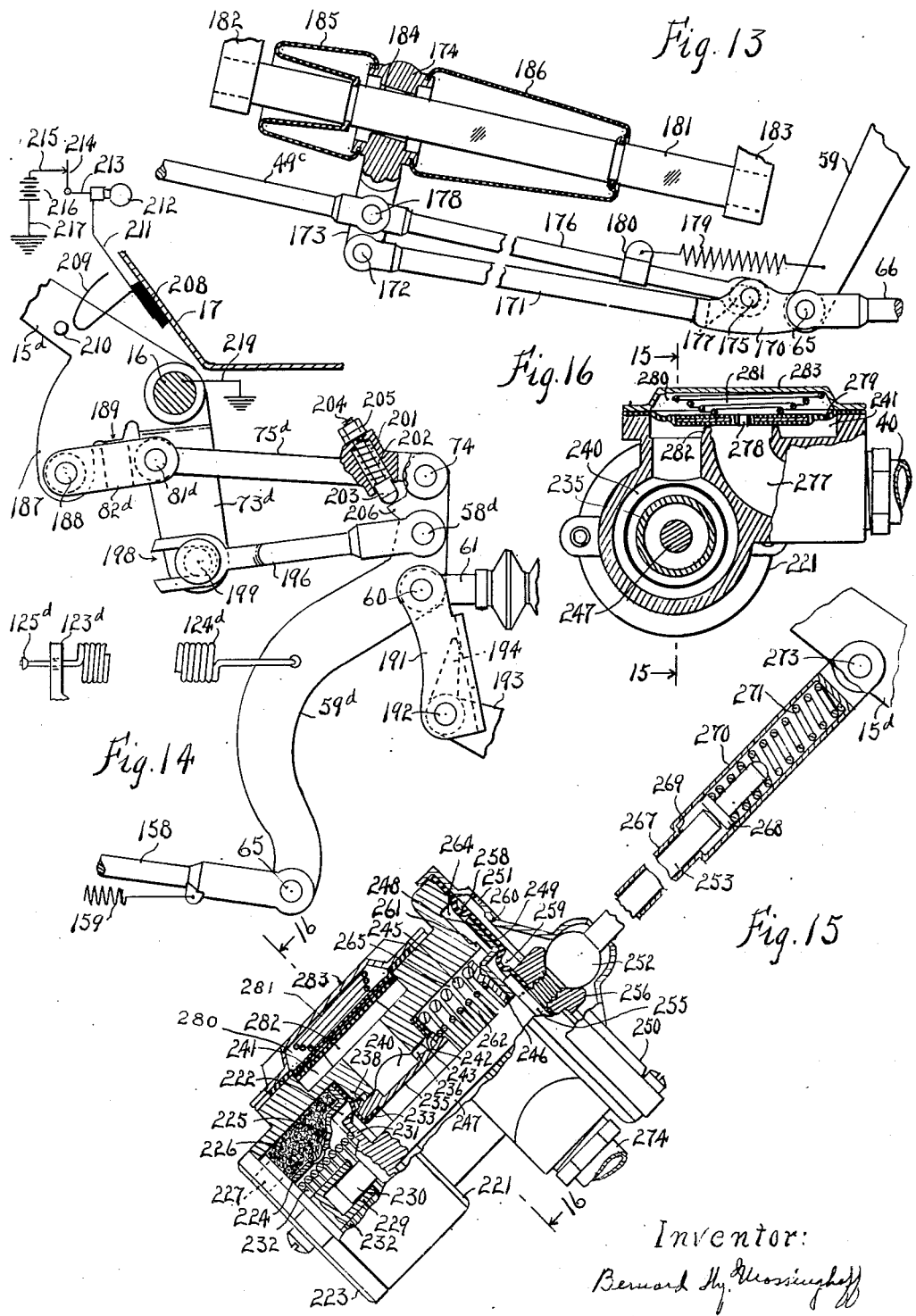

Patented Apr. 3, 1945

2,372,842

UNITED STATES PATENT OFFICE 2,372,842

BRAKE OPERATOR

Bernard H. Mossinghoff, Chicago, Ill.

Application August 16, 1941, Serial No. 407,115

20 Claims. (Cl. 188—170)

This invention pertains to brake operators, with particular application to the wheels of motor vehicles. Reference is made to my application Serial No. 399,908, filed June 26, 1941, presenting and claiming accelerator disconnectors, including the type herein disclosed. Also, to my application Serial No. 253,485, filed Jan. 30, 1939, which issued into patent numbered 2,311,120 disclosing and claiming a brake operator of the general purposes as the herein. Also, to my application, Serial No. 404,688, filed July 30, 1941, presenting a low-pedalled directly powered form of brake operator.

The aforesaid applications present the chief objects generally, particularly that of safety through accident prevention, by a quicker than customary application of the vehicle's brakes. It seems established that with the present common brake pedals and system, about ¾ of a second is required, with quickest emergency effort, before the brakes begin to pressure apply. This corresponds to 66 feet of un-braked car roll, at 60 M. P. H. This invention aims to substantially reduce such time and road distance requirement, by providing a low-positioned pedal, preferably of about the heighth of the conventional accelerator pedal; and moreover, preferably an arrangement permitting the foot to quickly slip-over by slight lateral rock on heel from its accelerating position to its position over the brake pedal. To better accommodate this purpose, I provide, in combination, that the accelerator pedal become automatically disconnected or made ineffective for normal engine control upon the initial operation of the brake pedal, thus permitting a substantial portion of the foot to remain over the accelerator pedal while operating the preferably lightly resistant brake pedal. Such objects, as driver's convenience, etc., as outlined in my aforesaid co-pending applications, are also served.

It is aimed to adapt the use of the low-cost and simple vacuum-powered system for such low- and quickly-operable brake pedal feature. In view of the occurrences of vacuum failure, such adaptation would present problems, which my novel provisions solve. The present disclosure involves the use of a strongly tensioned spring to apply the brakes, with vacuum power releasing the brakes and reenergizing the spring. It presents the novel feature that, should the vacuum fail to release the brakes, an automatic over-normal retraction of the brake pedal to a conventional-like long-stroked position would release the brakes, with subsequent braking being permitted muscularly through such conventional-like long-stroked brake pedal with its work stroke efficiency. Thus, I remove the serious defect of indirectly powered system (spring-applied) to insure brake release, a requirement for accident-prevention, while providing the advantage of the indirectly-powered system in assuring brake application by a compression spring, laterally contained so that a break in the spring would not render it ineffective. Such provisions are presented in my application 253,485; the application 404,688 disclosing a directly vacuum powered system.

Particularly in the heavier type of vehicles, a brake pedal leveraged for suitable lightness, and connected for itself muscularly to operate the brakes upon power failure or to supplement deficient power, might tend to retract an impractical amount to its long-stroked brake releasing position upon failure of the power to release the brakes, if special provision is not made therefor. In the aforesaid application 253,485, a bell-crank form of leverage changer is disclosed. In this present application I feature another form of leverage-changer, apparently better adapted for a larger leverage ratio change particularly for the heavier type of vehicles. I furthermore provide novel lock means, whereby predominance of foot pressure over that of the power actuator will not push back the power actuator in a differentially connected system, thus permitting the foot muscularly to supplement the power upon its accidental or designed deficiency. Such lock means is furthermore presented as adaptable for a unitary assembly with the power motor. Moreover, I disclose a novel pressure-indicated or so-called "compensating" principle of valving for an indirect vacuum powered system. Further objects will become apparent from the disclosure and as described.

In the illustrations:

Fig. 1 presents a side elevational view, partly in section, of my device as connected for operation of the conventional master cylinder of hydraulic brakes.

Fig. 2 shows a lateral elevation of the accelerator disconnecting device of Fig. 1.

Fig. 3 presents a lateral elevation of an enlarged detail portion of Fig. 1.

Fig. 4 is a sectional detail view, taken along line 4—4 of Fig. 3.

Fig. 5 presents a sectional detail view, taken along line 5—5 of Fig. 3.

Fig. 6 presents a side elevation of the leverage changer portion in the position with the brake pedal fully retracted to its abnormal long-stroked position, with the brakes fully released.

Fig. 7 presents the leverage changer portion of Fig. 6 in the position of purely muscular application of the brakes, the power having previously failed.

Fig. 8 presents a laterally sectional view of details of parts within the tube 50 unitary with the vacuum motor of Fig. 1. It shows the unidirectional lock mechanism.

Fig. 9 presents a transverse section, taken along line 9—9 of Fig. 8.

Fig. 10 presents sectionally a detail modification for a portion of the device shown in Fig. 8.

Fig. 11 presents laterally sectionally a modification to supplant the device shown in Fig. 8, incorporating also in the unitary assembly the actuating spring 69 (Fig. 1).

Fig. 12 presents mostly sectionally a modification for a portion of Fig. 8.

Fig. 13 presents a lateral elevation, partly in section, of a modification in the form of another lock principle to supplant substantially the whole device of Fig. 8.

Fig. 14 presents in lateral elevation a modification of the leverage changing system to supplant the disclosure of such portion in Fig. 1 and in Figs. 3 to 7 inclusive.

Fig. 15 presents side elevationally and partly sectionally a modification in the form of a compensating type valve to replace the valve 42 of Fig. 1 and the cushion spring 76 shown in Fig. 4. The view is along the line 15—15 of Fig. 16.

Fig. 16 is a transverse mostly sectional view, taken generally along the line 16—16 of Fig. 15. It discloses in detail the fairly leak-proof check-valve portion, in combination with the control valve.

Fig. 17 presents in elevation a composite unit of the invention inclusive of the modifications of Figs. 13 and 15.

The device of Figs. 1 to 9

The brake pedal 15 is rockably mounted on the fixed bearing pin 16 and has an arcuated arm passing through the foot board 17 terminating in the foot pad 18 as an integral part of the pedal. On the same foot board is pivotally mounted the conventional-like accelerator pedal 19, a torsion spring 20 however encompassing the pedal's fulcrum pin so as to tend constantly to hold the pedal in its rearmost position shown in Fig. 1, and which accelerator pedal through its thrust rod 21 connects pivotally with the lever 22 rockably mounted on the cross shaft 23, which is itself rockably mounted in the bracket 24 affixed onto the foot board 17. To this cross shaft is affixed the lever having an arm 25 carrying pivotally the pawl lever 26 normally registering with some lost-motion provision at 27 with a detent in the periphery of the lever 22. To the pawl 26 is laterally fixedly riveted the arm 28 carrying pivotally at its end the operating pull rod 29 leading to the floating lever to be later explained, so that a downward pull on the said rod would remove the pawl 26 from its engagement with the lever 22 against the tension of the tensioned tensile spring 30 constantly urging pawl engagement. Another arm 31 integral with the arm 25 carries the connecting link 32 pivotally connecting with the moving extremity of the lever arm 33 affixed for co-movement with the throttle valve 34 for the engine intake manifold 35 of the vehicle's engine 36, the tensile spring 37 tending constantly to hold the lever 33 against the stop 38 urging the throttle closed, as conventionally, an idler adjustment screw being providable as conventionally. Said throttle and connections are merely representative, since acceleration control for a Diesel engine or electric motor require different constructions.

The tube 40, connecting into the engine's intake manifold 35, leads through a conventional shut-off cock 41 to the combined control- and check-valve 42, full details of which valve are understandable from Fig. 2 in Pat. No. 2,311,120 though it may otherwise be of any suitable structure, for controllably connecting the vacuum motor 43 of the well-known rubber diaphragm type, either with the atmosphere or alternatively with the manifold 35 as the vacuum source. The check-valve element of the valve 42, as detailed in the aforesaid patent and also in Fig. 16 herein affords a fairly leak-proof construction. The control valve portion of the valve 42 has a neutral position whereby connection both to the atmosphere and to the intake manifold 35 is simultaneously closed. A tensioned spring inside of the valve 42 tends constantly to urge the grit-capped stem 44 upwards against the valve control lever 45 to reestablish communication between the vacuum motor and the manifold 35 upon brake release.

The vacuum motor 43 is of the conventional-like rubber diaphragmed type, comprising the diaphragm rubber 47 held as conventionally between two metal plates clamped together by the threaded nut 48 screwed onto the shouldered stem 49 leading rearwards (rightward viewing the drawing Fig. 1) to a connecting mechanism in the tube 50 affixed unitarily to the vacuum motor 43, for purposes to be later described. The nut 48 abuts against a rubber cushion 52 affixed to the inner wall of the vacuum motor. A conical compression spring 53 tends constantly to urge the diaphragm and stem 49 rightwards against the vacuum suction existing normally in the chamber 54 when the brakes are in release as shown in Fig. 1, with the chamber 54 being in communication with the engine manifold 35.

Referring now to Figs. 1, 3, 4 and 5: Pivotally mounted on the fixed bearing pin 16 and to both sides of the brake pedal's bearing boss is the stamped substantially channel-shaped radius and supporting lever 57, carrying by means of the pin 58 the floating lever 59, connecting at pin 60 with the plunger rod 61 of the conventional master cylinder 62 with its standard liquid reservoir 63, as mounted on the fixed plate 64, of the conventional hydraulic brake systems. Rightward movement of the plunger rod 61 applies the vehicle's brakes. At the lowest extremity of the said floating lever is connected by means of the pin 65 the connecting rod 66 slidable through the bushing 67 affixed to the cylindrical enclosure tube 68 containing the strongly tensioned compression spring 69 bearing against said bushing 67 and the plate 70 affixed to the extremity of the rod 66. The tube 68 is pivoted at the fixed point 71 onto the vehicle chassis. It is characteristic of such laterally confined compression springs that, should the spring break, it would remain substantially effective. The actuating spring 69, accordingly, constantly tends to force the pin 65 and therefore the floating lever to the right for brake application, and becomes so operable upon release of the resistant vacuum suction in the chamber 54 of the motor 43.

The upper end of the floating lever 59 is bifurcated (Figs. 3 to 5), thus permitting a suitably offset lower arm 73 of the brake pedal 15 to be accommodated between the prongs of the fork for functional abutting contact with the pin 68. At the upper extremity of the said bifurcated floating lever 59 is pivoted by means of the pin 74 the end of the plunger 75, having a shoulder enlargement bearing against the square wired cushion spring 76, through which passes the plunger stem 77, integral with 75, a further reduced diameter of which stem passes slidably through a bore in the spring barrel member 78, said reduced diameter establishing the shoulder 79 to limit the compression movement of the spring 76, a retainer pin 80 serving to retain the assembly and to provide some preferable initial tension for the spring. The left end of the spring barrel member 78 carries the pin 81 and is forked to accommodate an end of the short thrust link 82 pivoted on said pin, the left end of which link is open-slotted at 83 to encompass the diametrically reduced portion of the headed stud 84 firmly affixed in the pedal's lower arm 73. Similarly affixed in said arm is the check stud 85 to serve as upper limiting stop for the link 82, said stud having a shallow groove preferably of inclined walls to receive and retain for better alignment the link 82.

Pivotally carried by the aforesaid pin 81 is the upper forked end of the rod 86, the prongs of which are to both sides of the link 82, and which rod has a shoulder 87 bearing against the initially tensioned compression spring 88, the lower end of which spring bears against the spherically concaved bushing 89 slidable over the rod 86, the bushing cooperating with a correspondingly spherically convexed nodule formed in the fixed plate 90, the slot 91 permitting swinging freedom for the rod 86. Screwed onto the lower end of the rod is the ball joint nut 92, adjustable by the lock-nut 93. The plate 90 serves also as a stop for the floating lever 59. It is obvious that the described structure between the pins 74 and 84 constitute a double-linked toggle, with a cushion spring therebetween, which toggle will be collapsed upon the pin 81 moving downward relatively to the pedal arm 73, in other words when the stud 84 moving with the clockwise rocking of the pedal 15 on its fulcrum pin 16, is raised upwards to the position shown in Fig. 6, which is that of an abnormally retracted brake pedal to its long-stroked position. In Figs. 1 and 3 the toggle is securely locked, due partly to the position of the pin 81 being above the line drawn from the stud 84 to the pin 74, and due further to the tension in the spring 88.

For valve operation, the right end of the connecting rod 95 is pivotally connected at 96 with the floating lever 59 in any suitable manner as that of a 90 degree bend of the rod end, which rod slides through the bushinged end of the spring enclosure tube 97, thence passes through the tensioned compression spring 98 and has the collar 99 affixed at its end against which said spring bears to urge the rod 95 leftwards relative to the cylindrical tube 97. Said collar 99 abuts against the bushing 100 affixed to the tube 97, into which bushing is threaded and locknutted by means of the nut 101 the rod extension 96 connecting at its left end pivotally with the valve lever 45. The initial tensioning in the spring 98 is sufficient to assure that the rods 95 and 96 move in unison as though one piece for the normal operation of the valve 42, but the spring will permit the foot pad 18 of the brake pedal to move fully to the foot board 17, though the movement of the valve stem 44 be limited.

I will now describe the non-reverse locking device which is enclosed in the tube 50 and is shown in detail in Figs. 8 and 9. The diaphragm rod 49 of the vacuum motor 43 (Fig. 1) has integrally or suitably affixed to its right end the cylindrical member 103 having the continuously annular groove 104 and the cylindrical head portion 105. In said groove 104 are loosely inserted the flanged ends of the three identical friction shoes 106, 106' and 106" (Fig. 9) mutually closely fitting to form virtually a peripherally complete enclosing cylinder, the right ends of which three friction shoes being similarly flanged to radially project in the continuously annular groove 107 formed in the cylindrical piston member 108, having an enlarged cylindrical plunger head portion 109, and having its right end bored to suitably accommodate in the manner of a ball thrust joint the partially spherical head 110 integral with the connecting rod 111, threaded into the clevis 112, which pivotally connects with the pin 65 of the floating lever 59 (Fig. 1), to which clevis the rod is held by the adjusting nut 113. The head portion 110 is retained in ball-joint manner in the member 108 by means of the retaining bushing 114 itself held in place by the soft metal expansion ring 115. It is apparent that the described parts serve to transmit the suction pull of the vacuum motor's diaphragm 47 to the floating lever 59 for swinging and holding it in its shown leftmost position against the strong tension of the actuating spring 69 (Fig. 1).

The solid and cylindrical rubber bar 116 is placed within the cylindrical hollow formed by the said friction shoes, as 106, and between the two plunger heads 105 and 109, with sufficient loose fit to allow for thermal expansion of rubber. This solid rubber bar has preferably a soft rubber core to provide better pressure dispersing fluidity, the outer shell of the rubber being preferably of harder vulcanized durometer characteristics. Accordingly for its fabrication, the rubber bar 116 may optionally be of two parts. The right end of the rubber bar is preferably somewhat convexed to provide surplus initial expansion space. The whole so far described as internal to the tube 50 form a unitary assembly axially slidable in the enclosure tube 50, which is shown as of a casting, and lined with preferably a non-squeak soft metal liner 117, of soft brass or of lead with sufficient antimony to resist fluidity under pressure, or of any suitable material. The conventional-like longitudinally expansible rubber dust guard 118, mounted between the rod 111 and the tube 50, closes the right end of said tube. The mounting ears as 51 (Fig. 1) serve to hold the entire motor and lock tube assembly fixed on the vehicle chassis, the motor 43 being affixed in any suitable manner onto the tube 50, such as by means of the circular reinforcing plates 119 and 120, the part 121 being a cup-shaped grit cover over the conventional perforations of the vacuum motor to atmosphere.

As to the operation of the parts in Figs. 1 to 9, so far described: The positions shown in full lines in Fig. 1 are that of the brakes fully released, and with the vacuum having been properly available and operative to give the shown low position of the brake pedal's foot pad 18, which is its normal position, with the foot off of the pedal.

Assumedly, the driver has, in the previous instant, removed foot pressure from the accelerator pedal preparatory to quick brake application. For this purpose his foot is preferably retained resting on its heel, rocking the foot laterally on the heel to top at least a portion of the brake foot pad 18, thus saving the time required for bodily relocating his foot even on a low-positioned brake pedal. The initial depression of the brake pedal 15 causes the pin 74 to move to the right, thus causing a rightward pull on the valve rods 95 and 96 to force the valve stem 44 downwards, with the effect of first closing the communication between the chamber 54 and the intake manifold 35, and instantly thereafter opening communication between the said chamber 54 and the atmosphere. The valve and its connections are arranged so as to require only a small amount of movement of the valve stem 44, or of the rod 95 to effect such valve operation. The consequent admission of atmospheric air into the chamber 54, permits the actuating spring 69 to swing the floating lever 59 counter-clockwise on the pin 74 as the fulcrum, to apply the brakes by forcing the master cylinder plunger 61 to the right. Upon the initial swinging of the floating lever 59, a pull is exerted downwards on the accelerator disconnector rod 29, to remove the pawl 26 from the peripheral path of the lever 22, thus permitting the foot to remain even mostly over the accelerator pedal 19 while braking, since its depression would revolve the lever 22 freely on the shaft 23 without effect on the lever arm 31 and on the throttle 34. Lost-motion at the pawl engaging point 27, or optionally alternatively a surplus heighth of the brake pad 18 over the foot surface of the accelerator pedal 19 (both provisions are shown in the drawings) would prevent frictional contact with its consequent wear of the functional pawl surface during the prompt operation. Further details and forms of accelerator disconnectors, adaptable to the herein disclosed, are presented in my application 399,908 aforementioned, some forms providing that the accelerator pedal become virtually the brake pedal upon similar foot movement.

The cushion spring 76 (Fig. 4) is preferably initially tensioned to an extent at least so that the parts 75 and 78 move as one piece during the aforesaid initial valve operation. However, the reaction force from the master cylinder plunger 61 causes leftward pressure on the pin 74, which will to a corresponding degree compress the cushion spring 76, which spring compression has the tendency to move the valve rod leftwards to check the vacuum exhaust from the motor 43 (I speak of vacuum as though it were positive pressure), with the result that the force on the master cylinder plunger 61 registers with the amount of compression of the cushion spring 76, which itself is determined by the foot pressure on the brake pedal. The said cushion spring 76 is strong and functionally short having a high amount of tension variation per compression stroke. Optionally, it may be designed to function throughout the total of normal pressure braking, or it may be made to compress functionally for only the lower range of braking pressure, before the shoulder 79 abuts against its stop to check the spring's compression. This spring 76 accordingly serves the purposes of valving modulation, also to prevent shock to the braking system, and incidentally to obviate the illusory feeling, gained from experience, of the foot pad 18 travelling to the right during braking pressure progress. However, the optional location of the pivot point 96 (Fig. 5) of the valve rod higher than instead of on the pivot pin 74 aids to serve the just indicated purposes, so that the cushion spring 76 may even optionally be dispensed with, in which case the parts 75 and 78 would be constructed as one piece. Due to the shown location of the point 96, the counter-clockwise swinging of the floating lever 59 upon brake application as described, and on the pin 74 as its fulcrum, would necessitate a gradually further depression of the brake pedal pad 18 with the gradual swing of the lever 59, in order to maintain the valve lever 45 in a virtually constant position of valve operation, just at the verge of exhausting more vacuum from the chamber 54 for higher pressure braking, the movement of the valve rod 95 being designed to be short for the valving control. My application 253,485 of previous mention discloses further details of the valving control. It should be noted that the floating lever 59 is differentially connected for the pivot points 74, 60 and 65. The hydraulic braking pressure is determined by the foot pressure on the brake pedal. Moreover, the shown mutally reactive differential interconnection involves a virtual race between the foot and the power actuation. The power unit and actuating spring 69 is therefore preferably made strong, optionally sufficient to take care of the major part if not all of the normal pressure braking, particularly in view of the resistance offered by the flow of hydraulic liquid through its circuitous passages and restrictions during quick brake application. This would not apply to the same degree to so-called "mechanical" brakes, for the actuation of which the herein disclosed invention is likewise adapted, by the use of a thrust rod connection to the pin 60, similar as disclosed in my application 404,688.

As to the operation of the non-reverse lock device of Figs. 8 and 9: It occurs with vehicles that abnormally high braking pressures are at times required, for which it seems preferable not to provide an actuating spring and vacuum power capacity to meet. Moreover, it is optional to provide a power capacity insufficient to take care even of all normal high pressure braking. Joined with these considerations, it might frequently occur that the brake pedal, when operative to muscularly supplement the deficient power, would creep too near to the foot-board 17, especially in heavier vehicles relative to the leveraging for the light pedal pressure requirement, for which situation it would be useful to retract the pedal for a moment for the sake of pedal recovery to a higher position from the footboard for subsequent further braking muscularly. For such-like reasons I provide the unidirectional locking device of Figs. 8 and 9. After the limited capacity of the power system including that of the actuating spring 69 (Fig. 1) has moved the floating lever's pin 65 to the right as far as its force capacity permits, further supplemental foot pressure on the brake pedal will tend to move the said pin 65 leftwards. However, such supplemental pedal pressure and consequent partial further depression of the pedal will have pulled the valve rod 95 still further rightward with the result of full breakdown of all vacuum in the chamber 54 of the vacuum motor, thereby permitting the conical spring 53 of the vacuum motor to push the cylindrical member 103 and its associated friction shoes as 106 rightwards, with the piston head 109 associated with the brake pedal movement remaining stationary or tending to move leftwards in the tube 50. As a consequence the rubber bar 116 will be axially compressed, for which function the aforesaid conical spring 53 is to be of sufficient tension. Rubber being practically incompressible volumetrically, and having fluidity characteristics, the rubber bar 116 will expand laterally to press the friction shoes, as 106 against the friction liner 117 of the tube 50 for initial frictional grip to prevent easy axial sliding of the assembly internal to the tube 50. The tension of the conical spring 53 is securely sufficient to accomplish such initial frictional grip. Upon further pressure and depression of the brake pedal, the plunger head 109 will press still further on the rubber bar 116 to increase the frictional bind between the shoes as 106 and the liner 117. The quantitative design of the exposed lateral area of the rubber bar 116 in ratio to its cylindrical diameter are such that automatic self-locking is obtained with a margin to spare, so that the heavier the leftward pressure on the rod 111 the more the frictional bind, and in greater relative proportion. A thicker portion of the right convex end of the rubber bar 116 is preferably made of harder rubber for greater security of pressure distribution through the body of the rubber instead of the peripheral edge of the metal plunger head 109 coming into abutment with the rubber. The inner edges of the metal friction shoes as 106 (though they may be of other materials than metal) at their mutual junctures are somewhat rounded to prevent pinching of rubber at such junctures upon pressure release. It is apparent that should the driver let the brake pedal back from a position close to the vehicle's foot board 17, a position as might have been due to the thermal expansion of the vehicle's brake drums which demands compensatingly a longer pedal depression, or due to hydraulic liquid leaks from the brake system, etc. during the current braking operation, the actuating spring 69 (Fig. 1) will move the assembly internal to the tube 50 still farther rightward during such pedal retraction, with the result that the lock device of Fig. 8 will assume a more rightward position in the tube 50, with consequent new and more retracted position of the brake pedal for further braking. It is obvious that a material of suitably high frictional coefficient may replace the liner 117, or the surface on the shoes 106.

As to the retraction of the brake pedal to its abnormal and longer-stroked position: This is perhaps better understandable by describing the fuller retraction of the pedal upon a vacuum leak from the chamber 54 presumably through the valve, as when the vehicle stands inoperable in the garage. Such gradual vacuum leak would permit the actuating spring 69 (Fig. 1) to gradually force the pin 65 rightward. Since I preferably provide lost-motion as shown between the spring lug 123 integral with the lever 59 and the enlarged end 125 of the closed coil but initially tensioned tensile retract spring 124 (Fig. 1), the initial swing rightward of the said pin 65 will push to the right the master cylinder plunger 61, to first take up the customary lost-motion of such plungers, and thereupon to move the master cylinder piston slightly until the customary compensation drilling, a very small drilling in conventional hydraulic brake master cylinders, is covered by the lip of the master cylinder's rubber cup. At that point the hydraulic resistance is that caused by the brake shoe retract springs. If such shoe retract springs are designedly not of sufficient resistance to cause the brake pedal 15 to start its retraction movement to its long-stroked position, indicated by 15a (Fig. 1), the disclosed lost-motion between the lug 123 and the retract spring end 125 must first be taken up by a corresponding counter-clockwise swinging of the lever 59, so that contact between the said lug 123 and the spring end 125 will add sufficient resistance to cause the possibly cumbersome brake pedal 15 to rock on its bearing pin 16 clockwise by reason of the leftward thrust through the member 78 (Fig. 3) due to the leftward pressure exerted on the pin 74 by the aforesaid counter-clockwise swinging of the lever 59. Particularly after contact of the lug 123 with the spring end 125, the gradual rightward swinging of the lever 59 will accordingly cause the brake pedal 15 to gradually approach its long-stroked position 15a, instead of forcing the master cylinder plunger 61 to move to the right causing brake application. Moreover, after contact of the said lug 123 with the spring end 125, the lever 59 will reassume its shown contact with the check plate 90, thus assuring uncovering of the master cylinder's compensation drilling above indicated.

However, because of the leverage inherent in a system which provides a suitably light pressured brake pedal especially in a heavier vehicle for the normal low-pedal braking operation, the brake pedal 15 would retract an impractical amount by the time that the pin 65 reaches its rightmost limit as actuated by the spring 69 and as determined in the disclosed structure by the limiting contact of the end of the rod 66 against the right wall of the spring tube 68. For which reason I provide a leverage changing mechanism, operable during the said abnormal retraction of the brake pedal and serving to reduce the amount of retraction stroke of the pedal so as to position the pedal a practical distance from the foot board 17 for its abnormal long-stroked condition. However, since the occurrences for the long stroked muscular braking as substitute for the failing power, are highly infrequent, the brake pedal may satisfactorily assume a more rearward position than customary, since normal convenience is not a consideration, as it is conventionally. During the afore-described retraction movement of the brake pedal 15, the pin 81 describes a leftward moving arc with the ball joint at 92 (Fig. 3) as a center. As is apparent from Fig. 6, this has the effect of collapsing the toggle comprising the member 78, so that the lower arm 73 of the brake pedal contacts the pin 58, which contact would remain effective for subsequent muscular operation of braking, as substitute for the power, during which muscular braking the spring 88 would compress as disclosed in Fig. 7, a view of foot pressure applied braking.

The pedal's lower arm 73 in relation to the pin 58 has moreover preferably another purpose. For the normal low-pedal powered braking, it is preferable to quantitatively design the lever system, so that the said lower pedal arm 73 contacts the pin 58, and thus transfers the leverage from the pin 74 to that of the pin 58 before the pedal pad 18 would otherwise reach fully to the floor board 17, when supplementing the power as previously described, and so operable even under the condition of the brake shoe linings having worn so as to cause the actuating spring 69 to have reached the limit of its stroke, indicated by the dotted outlined position 65b (Fig. 1) for the position of the lever 59. This however is optional. Such leverage changing before reaching the foot boards would have the purpose of checking the rate of depression of the pedal in its further depression movement, with correspondingly heavier foot pressure inherently involved in the leverage change. It becomes apparent, incidentlly, that should the brake shoe linings be worn beyond the stroke capacity of the actuating spring 69, the brake pedal 15 would depress an overamount for further braking, though the vacuum be available, which overdepression of the pedal may be taken as an indication by the driver that the shoe linings are to be newly adjusted. However, in a heavy vehicle, particularly of the commercial class, it seems preferable to provide an electric bulb indicator for such adjustment requirement as is disclosed in my application 404,688. On basis of quantitative design which provides that the arm 73 contacts the pin 58 before the pedal pad 18 reaches the foot board 17 during normal operation, but when muscularly supplementing the power, and even when the brake linings are worn beyond the capacity of stroke of the actuating spring 69, as above indicated, it would imply that the toggle comprising the member 73 would virtually straighten out for the view of Fig. 7, when the brake linings are so completely worn with consequent further depression position of the brake pedal than is shown in Fig. 7.

When the previously wanting vacuum suddenly becomes available, as when restarting the engine after a long period in the garage, the vacuum motor would pull the pin 65 to the left thus swinging the lever 59 clockwise while resting on the stop 90 as a fulcrum, thereby straightening out and setting the toggle (view Fig. 6) to return the lever system to the position shown in Fig. 1, ready for the normal low-positioned pedal and powered braking operation. As to the dotted outlined positions of the brake pedal pad 18, disclosed in Fig. 1, the position 18a is that of operation of the valve 42. The position 18b, which is designedly optional and dependent on the functional tension variation of the chosen cushion spring 76 (Fig. 4) (assuming that the point 96 (Fig. 3) coincides with the pin 74), is that of the brakes fully pressure applied for normal braking by the power system; an abnormally high braking pressure operation in which the foot muscularly supplements the power would fetch the pedal somewhat lower than that indicated by 18b. The position 18c is that of the lower arm 73 of the brake pedal contacting the pin 58 upon muscularly supplementing the power and when a long stroke is demanded due to lining wear or perhaps due to overheated and thermally expanding brake drums. The position 18d indicates the farthest depressed condition of the brake pedal's pad, when the foot muscularly supplements the power with largest permissible brake shoe lining wear. When the foot pad moves from the position 18c to that of 18d, the link 82 (Figs. 3 and 4) would move to the right relative to the stud 84, the open slot at 83 permitting such surplus pedal depression. It can be quantitatively arranged that should the power operate satisfactorily for a long period of time, so that the brake shoe linings become worn to the capacity of the stroke of the actuating spring 69, and that should thereafter the vacuum suddenly fail necessitating the long stroked pedal operation indicated by Figs. 6 and 7, the pedal would remain effective for such muscular operation before the pad 18 reaches the foot board 17. However, this is optional, particularly since lining wear conditions can be inspected in advance, otherwise.

Although the abnormal long pedal stroke operation has just been described on the basis of a vacuum leak from the chamber 54, it should be apparent that the brake pedal retraction to its long stroked position would occur when the vacuum motor fails to release the brakes, the said long stroked retraction of the pedal releasing the brakes as a substitute for the power. This is useful for accident prevention. Furthermore, if there be a leaking tendency from the chamber 54, the leak would actually become effective while driving with the throttle wide open, particularly when the vehicle's engine is under heavy load and not speeding, because of vacuum pressure reduction at the source. Under such condition, if provision were not made for the pedal's abnormally long retraction, the brakes would become applied instead, thus indicating another useful purpose of the provision. However, should the brake pedal have assumed its long-stroked position while driving with full throttle and under conditions of a leak as just above assumed, the brake pedal would instantly return to its normal low-position shown in Fig. 1, upon release of the accelerator pedal, due to the suddenly greatly increased vacuum pressure upon such throttle closing, particularly with a speeding engine. An added provision of a vacuum reservoir tank with a leakless checkvalve type of Fig. 16, as is disclosed and described in my application 404,688 would almost completely compensate for such assumed leak. Incidentally, my soft rubber seated valve structure disclosed in my application 253,485 has been proven in practice to be fairly leak-proof for long periods. It will be observed that a downward pull is exerted on the accelerator disconnector rod 29 (Fig. 1) thus effectively disconnecting the accelerator, when a leak from the chamber 54 permits the pin 65 to move to the right. This would be an indication to the driver while attempting to accelerate, that the brake pedal is assuming its abnormal long-stroked position. If the accelerator disconnection occurs while holding the accelerator pedal 19 depressed, the sudden closing of the engine throttle 34 would immediately replenish the vacuum in the chamber 54, and in the vacuum reservoir tank, if such be employed, whereupon after letting back the accelerator pedal momentarily, acceleration can proceed. However, accelerator disconnectors are disclosed in my application 399,908, which are operable for accelerator disconnection only while intentionally braking, if the above intimated indication to the driver be not desired. One of such disclosed forms provides that the rod 29 co-moves with the pin 60 after some lost-motion.

As to the normal brake release operation when the normal low-positioned brake pedal and the power system is effective: Release of the foot pressure from the pedal pad 18 permitting the brake pedal to retract, due to the hydraulic reaction pressure in the brake system, to the brake shoe retract springs, to the retract spring 124 and to the spring tension in the valve 42, the valve 42 would become operable to establish communication between the intake manifold 35 and the chamber 54, thus introducing vacuum suction in the chamber 54 causing the vacuum motor 43 to pull the pin 65 leftwards against the tension of the actuating spring 69, to return all of the parts to the brakes released position shown in Fig. 1. It is meant in the disclosure that the tension of a spring in the valve 42 urging the valve stem 44 upwards to its limit shown, is sufficient to return securely the pin 74 leftwards to its position shown in Fig. 1, notwithstanding an upward thrust through the lever 59, due to the non-parallellism of the power rods 111 and 66, and in view of the non-alignment linearly of the pins 65, 58 and 16. However, if the depth of the vehicle's chassis suitably permits, it is preferable to mount the swivel point 71 of the actuating spring tube to a lower position, or alternatively to lower the vacuum motor 43, so as to substantially align the rods 111 and 66 to reduce or cancel the sine factor; or by the application of other provisions well-known to engineers. It should be noted that the initial tension of the spring 98 (Fig. 1) in the valve rod connection dominates over the tension of the valve spring in the valve 42. The position of the brake pedal pad 18 is determined, at least primarily by the adjustment of the ball joint 92 (Figs. 1 and 3), the stored tension in the compression spring 88 being sufficient to securely support the weight of the brake pedal.

Now as to the purpose of the lost-motion shown between the lug 123 and the spring end 125 (Fig. 1): When the driver's foot is released from the foot pad 18 with fair quickness for brake release, the vacuum motor 43 might not act as promptly to reach the full brakes released position shown, particularly since the cushion spring 76 (Fig. 4) functions to make the system a pressure-indicated one, whereby the tension of the said cushion spring in moment must be reduced through foot pressure release below the tension moment of the brake shoe retract springs before the vacuum motor (due to valving control) would negotiate the longer retract stroke which advances the brake shoes away from their drums. Moreover, the initial tension of the said cushion spring 76 might optionally be made to predominate over the said shoe retract springs. If the retract spring 124 for the lever 59 were connected as conventionally without lost-motion between 123 and 125, the brake pedal upon foot release therefrom would continue to retract a surplus amount beyond the position of the foot pad 18 shown in Fig. 1, momentarily until the vacuum motor would catch up and cause the lever 59 to rest on its stop plate 90 (Fig. 1). This might occur though the action of the vacuum motor be designed very prompt. The lost-motion between the lug 123 and 125 would make the retract spring 124 inoperative to retract the brake pedal during the final portion of the retract movement of the power motor and of the lever 59. Said lost motion may be made of sufficient amplitude so as to securely have the effect merely to cause contact between the lever 59 with its rest stop on the plate 90, when the pin 65 has travelled rightward, as may be due to vacuum leak from the chamber 54, to its dotted outlined position 65b indicating the capacity limit of the power stroke system. This, in the matter of degree, is optional; as is furthermore optional the provision of an additional spring such as spring 94 (Fig. 1), to aid in retraction of the lever 59 with a tension insufficient to cause retraction of the pedal pad 18 beyond its shown position in Fig. 1. Such additionally provided retract spring obviously would assist the spring in the valve 42, which latter as a consequence would be constructed of lighter tension. Such are matters mainly of mechanical ingenuity, and give consideration to the cumbersomeness of the pedal lever system of the particular design or vehicle. However, the preceding has been presented for ease of understanding, since the supposition assumed does not fully hold true on basis of the disclosure. The location of the pivot point 96 (Fig. 3) of the valve operating rod 95 has the effect that the brake pedal must be retracted for normal brake release a surplus amount beyond that indicated by the remaining tension in the cushion spring 76, therefore it provides more time for the brake release operation of the vacuum motor 43. Whereas the cushion spring 76 employs the pressure-indicated principle, the location of the pivot point 96 higher than the pin 74 employs the movement-indicated principle, the disclosure showing a compromise of the two, and as above intimated either principle may optionally be employed solely, thereby affecting the problem of a surplus bounce-back of the brake pedal pad 18 upon brake release. Involved in this problem is the fact that the positions of the valve stem 44 for brake application and for brake release are not fully coincident, though the intervening movement of the valve stem be designed as small as practical.

When the brake pedal 15 is fully retracted to its abnormal long-stroked position, as is shown in Fig. 6, the master cylinder plunger 61 is fully retracted with the lever 59 resting on its stop 90. However such full retraction is not as importantly required for mechanical brakes, since a retraction of the brake shoes away from their drums to about half of the normal retraction distance might be considered satisfactory for the highly infrequent long-stroked muscular application of the brakes. This matter quantitatively affects the leverage design and the matter of amount of retraction of the pedal. So also such full retraction of the master cylinder plunger 61 is not so importantly required with the earlier types of hydraulic brake master cylinders employed on automobiles, before the "pumping" feature has been introduced (brake liquid replenishment by speedy reciprocation of the pedal). It should be noted however that, when the currently conventional "pumping" type of master cylinder be used, more effective "pumping" is attained by my disclosed invention, due to the speed of reciprocation of the disclosed power system by valving with the short stroked pedal, as compared with today's conventional brakes. The full retraction position shown in Fig. 6 is postulated by the desideratum of uncovering the conventional compensation drilling in master cylinders whereby any surplus liquid in the brake system is led back to the master cylinder's reservoir. Incidentally, I might state my experience that the requirement for muscular braking through the described long-stroked brake pedal did not occur once in many months of vehicle operation on the roads with the device principles herein disclosed as they affect such long-stroked pedal operation. Such infrequency might induce some designers to consider full master cylinder plunger retraction as shown in Fig. 6, not to be absolutely required even in combination with the currently conventional master cylinders.

The hydraulic brake line tube 127 (Fig. 1), with the branch 128 for the rear vehicle wheels, leads from the master cylinder 63 through the tube 129 to the front wheel brake, shown representatively as the Lockheed type, comprising the hydraulic wheel cylinder 130, with its dual pistons for forcing apart the two brake shoes as 131, pivoted on the adjustably fixed pins as 132, and against the tension of the shoe retract spring 133, the eccentric adjusters 134 determining the brake release clearance of the shoes away from the brake drum 135 revolvable with the vehicle wheel.

The modification in Figs. 10 to 16

Fig. 10 shows an alternative structure for part of the assembly shown in Fig. 8. Except for changed dimensions, the parts 106a, 107a, 108a, 109a, 110 and 116a are of similar structure as the parts of similar characters in Fig. 8, except that the plunger head 109a has a slanted groove 137 milled therein to permit assembly therethrough of the initially tensioned compression spring 138, one end of which bears against the enlarged head 109a, the other end of the spring bearing against the flanged ends of the three friction shoes, as 106a (see Fig. 9), the split cylindrical spacer 139 being also inserted therebetween and encompassing the said spring 138. The spring 138 functionally substitutes for the conical spring 53 of the vacuum motor 43 (Fig. 1) and serves the same purpose of initiating the lateral expansion of the rubber bar 116a to press the friction shoes for initial friction against the liner of the tube 50. Thereupon leftward pressure on the piston member 108a, consequent to foot pressure on the brake pedal would compress the rubber bar 116a, through the dished washer 140, serving to close the groove 137 against rubber entry.

The modification in Fig. 11 shows the brake actuating spring as combined in one assembly with the vacuum motor and non-reverse lock unit, and furthermore shows another form of expansible rubber bar principle for the non-reverse feature. It accordingly substitutes for the disclosure in Fig. 8 and for the actuating spring element of Fig. 1, comprising parts 66 to 71. Incidentally, it avoids the upwards thrust of force through the lever 59 (Fig. 1) due to the non-alignment of the rods 111 and 66, previously referred to. Affixed to the vacuum motor 43 is the cast tube 50b having the inner liner 117, and which tube has the integral bracket extension 142 for mounting the whole unit to the vehicle chassis or frame. The vacuum motor's diaphragm rod 49 has affixed to its right end the cylindrically symmetrical plunger head 143 having the continuous annular groove 144 accommodating a cylindrically complete set of combined friction shoe and tensile links as 145 (serving the same purpose as the shoes 106 of Fig. 8), the ends of which shoes however are formed for reinforced rigidity to permit the use of thinner material. The grooved conical portion 146 integral with the member 143 is firmly vulcanized into the solid rubber bar 147 molded normally somewhat barrel-shaped but shown of exaggeratedly restricted spool-like girth at its mid-section due to the longitudinally tensile force caused by the pull of the vacuum motor 43 in the shown position of brake release. Similarly firmly vulcanized and embedded in the right end of said rubber bar is the similarly grooved conical portion 148 of the cylindrically symmetrical plunger head 149, having the continuous shoulder 150 engaging the formed end of the friction shoes as 145, so that said shoes may serve as pull links during the shown force-effective position of the device. The tube 151, preferably cylindrically split for assembling reasons, has its left end flanged over the shoulder of the member 149, its right end being radially outwardly flared to flange over the edge of the orifice of the formed washer head 152 which bears against the strongly tensioned brake actuating spring 153 of the compression type, and of laterally caged condition, so that a break in the spring would not render it ineffective. The left end of the said spring bears against the washer 154 fixing the flanged end of the spring enclosure tube 155, thus held fixed onto the bracket member 142. Cooperating with this tube is the additional tube 156 flanged for co-movement with the washer 152 and thus serving as a telescoping enclosure for the actuating spring 153. It is apparent that the expansion tendency of the spring 153 would force the plunger member 149 and the assembly associated therewith rightwards in the tube 50b upon release of the vacuum pull on the rod 49, thus forcing rightwards the thrust rod 158 and consequently also the pin 65 at the lower end of the floating lever 59 (Fig. 1), for brake application. Thereupon in the brakes applied position, when the brake pedal should muscularly supplement the power system for further pressure braking, the coincidental full release of the vacuum suction in the motor 43 would cause the rubber bar 147 to contract longitudinally as it tends to return to its static barrel-shaped condition, thus exerting the required initial pressure radially outwards on the friction shoes as 145, for initial frictional bind against the liner 117, whereupon leftward force through the connecting rod 158, due to foot pressure on the brake pedal would intensify the laterally expansive force in the rubber bar 147 to increase the friction bind against the tube 50b or rather against its liner 117 in a self-locking ratio as described for Fig. 8. Accordingly the inherent tension in the rubber bar 147 supplants the conical spring 53 (Fig. 1) and the spring 138 of the modification in Fig. 10. Moreover, such rubber tension would serve to better fill out the space within the shoes 145 upon release of the suction in the motor 43. The tensioned tensile spring 159, mounted between the rod 158 and an ear welded on the washer 152, tends constantly to hold the rod 158 in abutment contact with the number 149, though it is obvious that other known constructions having the same effect may optionally be provided in lieu thereof.

The modification shown enlarged in Fig. 12 has the same relation to Fig. 8, as has been described for Fig. 10. However, as shown, it employs the conical spring 53 of the vacuum motor (Fig. 1) to initiate the frictional bind, though obviously the spring principle shown in Fig. 10 may replace such conical spring. It features a provision whereby the leftward movement of the plunger 108b relative to the rubber bar 116b and to the shoes as 106b will not tend overduly to push axially along the cylindrical periphery of the rubber bar 116b, and thus reduces the tendency to force the friction shoes as 106b with it, particularly after considerable wear on the frictional surfaces of the shoes as 106b or of the liner 117, which friction shoe movement tendency the tension strength of the conical spring 53 or of the spring 138 were meant to obstruct, in combination with the concavity of the right end of the rubber bar 116 (Fig. 8). Moreover, the effective piston area of the plunger head 109b is reduced, and it may be made so to any optional degree, below the cross-sectional area of the rubber bar 116b, as will become apparent. The right end portion of the rubber bar 116b is surmounted by a series of laterally containing and continuously annular rings or bands comprising the inwardly grooved band or hoop 162, the cylindrical ring 163, the inwardly grooved band 164, the cylindrical hoop 165 and the annularly flanged and grooved cap 166, against which latter the piston head 109b thrustingly abuts to compress the rubber bar 116b upon the brake pedal muscularly supplementing the power system. The said series of rings are mutually relatively movable, and also freely movable relative to the friction shoes as 106b in the axial direction. The juncture, for instance between the cylindrical hoop 163 and its adjacent grooved ring 164 serves virtually as a rubber diaphragm element, the rubber 116b permitting the said ring 164 to move relative to the hoop 163 when leftward rubber compression pressure is exerted on the piston head 109b. It varies in a novel manner from heretofore employed rubber diaphragm elements, in that my disclosure will withstand a very high internal pressure in the rubber. With rubber having an elastic modulus of 1000, which is about of the order of the hardest approximately of the commercial soft rubber stocks, of a durometer reading of about 75, 1000 lbs. per sq. inch pressure in the rubber bar 116b, would, I believe, cause the rubber to bulge out into the space between the ring 163 and 164 (as per our example) to form a cross-section of a semi-circle. If the inner groove in the ring 164 were designed axially short to cause acute rubber bulging also at that point, or rather at the neck between the hoop 163 and 165, the rubber bulge at the diaphragmatic space between the parts 163 and 164 would not be that of a semicircle cross-sectionally. However, the suggested axial shortening of the groove in the ring 164 would cause additional distortion of the rubber militating against durability of the unit; such design factors being optional according to the material employed.

Accordingly my disclosed structure is that effectually of several diaphragms in series. If each of the shown four open junctures between the cylindrical rings 163 and 163 with the grooved outer rings, were permitted 1/64" diaphragmatic movement, the four would cumulatively permit 1/16" piston like movement of the plunger head 109b to compress the rubber bar 116b. For operation, dependence is had on the fluidity characteristic of soft rubber, for rubber flow from the right end of the rubber bar to its main and left larger diameter portion. It is therefore preferable to design the inner core of the rubber bar 116b, particularly at its right end of suitably soft rubber stock so as not to offer high static resistance to fluid flow of the rubber, said soft rubber core having optionally an elastic modulus rating of about 150 to 200. Preferably such core extends throughout the length of the rubber bar 116b for pressure distribution. Accordingly the said soft rubber core might extend radially up to the cylindrical hoops 163 and 165, over which the harder rubber rings to fill into the grooves of the rings as 164 might be placed and cemented or vulcanized. It is obvious moreover, to apply the practice of placing the metal rings 162 to 166 in the rubber mould in the usual manner of rubber to metal fabrications, which would involve rubber filling the spaces as between the member 164 and 163 but not the spaces such as between the ring 164 and the member 162 in an appropriately made mould. Thereafter the separately formed inner core of very soft rubber may be inserted. The left flange of the grooved ring 162 is shown as extending radially further inwards than the flanges of the grooved ring 164. This is for the reason that the internal rubber pressure would tend to move the said ring 162 exaggeratedly to the right, which tendency the extra exposure of the larger flange of the ring 162 is meant to counteract by reason of its embedment and anchorage in the rubber stock. Obviously the metal rings 162 to 166 are to be of sufficient strength to withstand the maximum rubber pressure with an extra safety margin. It is furthermore apparent that the effectual area diaphragmatically is determined by the radius extending to the rubber flexing space between the rings 163 and 164, and therefore the area is less than that of the main cross-section of the left portion of the rubber bar 116b. If longer rubber compression stroke is desired for the plunger head 109a, further intermediate rings, as 163 and 164, may be added. The outer shell of harder rubber, which overlap the spaces between the three friction shoes as 106b, is preferably to be thin, perhaps 1/32" thick, the dotted outlines shown in Figs. 8 to 12 being meant merely to indicate an outer layer of harder rubber roughly. If the various shown friction shoes, as 106, are preferably to be fabricated as vulcanized onto the rubber bar as 116 by insertion of the metal shoes in the rubber mould, such rubber may designedly be made to protrude through the thickness of the said metal shoes through suitable perforations punched through the shoes, so as to provide rubber contact with the liner 117 with the higher frictional coefficient of rubber being taken advantage of. Such arrangements are optional.

Fig. 13 presents another form of non-reverse lock to serve the same purposes and in lieu of the locking devices shown in Figs. 8 to 12. Accordingly the connecting rod 49c connects to the vacuum motor's diaphragm directly (see Fig. 17) without passing through a tube as 50 (Fig. 1). To the pin 65 in the floating lever 59 is pivotally connected the fork clevis 170, the integral extension 171 of which connects by means of the pin 172 to the arm 173 of the lock member 174. Within the throat of the fork 170 is pivoted by means of the pin 175 the connecting rod 176 having its right end slotted for lost-motion at 177 and having its left end connected pivotally to the pin 178 through the arm 113, to which pin 178 is likewise connected the vacuum motor's pull rod 49c affixed to the diaphragm of the vacuum motor 43 (Fig. 1). A pretensioned tensile spring 179 is mounted between the lever 59 and a clip 180 affixed to the rod 176, tending constantly to pull the rod 116 closer to the said lever 59. The lock member 174 is axially slidably mounted on the square or rectangular steel bar 181, held fixed by the fixed brackets 182 and 183 attached to the vehicle's chassis. The member 174 completely encompasses the said square bar 181, having a substantially square hole 184 broached therein, the right end of the upper wall and the left end of the lower wall of said hole being somewhat rounded with large radius for pinching grip on the upper and lower surfaces of the bar 181 when the member 174 is tilted clockwise. The rubber dust guards 185 and 186 of the conventional-like telescoping type are mounted between the rod 181 and the member 174.

The parts are shown in the brakes-released position, with a heavy leftward pull on the rod 49c opposing the rightward pull of the actuating spring 69 (Fig. 1) on the rod 66, the opposing forces acting through the pin 175, and against the tension of the spring 179. In the shown position the lock member 174 is frictionally free to slide on the square rod 181, so that upon application of the brakes implying the release of suction pull leftward on the rod 49c, the actuating spring 69 will be free to pull the pin 65 to the right carrying the rods 49c, 171 and 176 as also the member 174 with it to the right. When however the brake pedal 15 is to supplement muscularly the power system, the full release of suction pull on the rod 49c will permit the tensioned spring 179 to pull the rod 176 to the right relative to the rod 171, thereby causing a clockwise tilt of the lock member 174 relative to the square bar 181 conditioning it to bindingly self-lock on the said bar upon forceful leftward thrust of force through the rod 171, as induced by overdominance of foot force on the brake pedal relative to the actuating spring 69. The leverage quantities compared with the frictional coefficient between the bar 181 and the lock member 174 are such that secure self-locking of the member 174 is attained, as seems apparent. The bar 181 and the member 174 are preferably suitably heat-treated. Upon release of the foot pressure on the brake pedal incidental to brake release, the locking effect will be broken by the leftward pull of the vacuum motor on the rod 49c, particularly in view of the fact that the initial foot pressure release will release the strain or leftward force on the rod 171. The pins 172 and 178 may be designed apart a suitable distance to enhance the ease of lock release. The hole 184 formed in the member 174 may be grooved out laterally to both sides of the bar 181 to provide ample passage for quick air transfer from one dust guard portion to the other, a hole in one of the two rubber dust guards taking care of any surplus air displacement. The spring 179 may be mounted between the rod 176 and the member 174 close to the bar 181 to the more secure tilting of the member 174 in view of friction at the pins 172 and 178; in any case the tension of the said spring 179 is to be sufficient to assure such tilting function. It is apparent that brake pedal stroke recovery to a higher pedal position is attainable, when it has travelled close to the foot board 17, by mere let back of the pedal, permitting the spring 69 to pull the member 174 farther to the right.

Fig. 14 shows a modified leverage changing system though incorporating the same fundamentals as shown in Figs. 3 to 7, which the structure of Fig. 14 replaces. It provides a greater freedom for quantitative designing for adaptation to some vehicles in which existing chassis obstructions might be encountered. It presents some further variations in details; also an electric bulb indicator giving notice to the driver that the brake pedal is seeking its long-stroked position, as will later become apparent. The brake pedal 15d has the integral arm 187 carrying the pin 188 pivoting the double forked toggle link 82d resting normally against the stop 189 on the arm 187, to which link is pivoted by the pin 81d the thrust rod 75d pivoted to the upper extremity of the floating lever 59d by means of the pin 74. Connected to the pin 65 of the lever 59d is the actuating thrust rod 158 of the power unit shown in Fig. 11. The master cylinder plunger 61, is pivoted by the pin 60 to the lever 59d and to the stamped channel-like lever 191 fulcrumed by means of the pin 192 on the fixed bracket 193 having the integral stop arm 194 against which the lever 191 rests when the brakes are released. The thrust link 196 is pivotally connected by the pin 58d to the lever 59d at its right end, while its left extremity is formed as an open slot 198 to engage the large headed stud pin 199 affixed to the lower arm 73d integral with the brake pedal, and which arm is suitably offset to permit freedom of toggle collapse of the links 75d and 82d. The rod 196 is also offset when required by the quantitative designing to prevent interference with the down-swing of the link 82d. The retract spring 124d of closed coils and with initially stored tension is mounted between the lever 59d and the fixed ear 123d with lost-motion extension of the spring's end 125d to function and to serve the described purposes of the spring 124 of Fig. 1. The rod 75d has formed therein the spring well 201 accommodating the tensioned compression spring 202 bearing against the upper wall of the well and against the plunger head 203 integral with the stem 204 passing through a drilling in the upper wall of the well and threaded to receive the adjusting nuts as 205 abutting externally against the upper wall of the spring well, the whole presenting a well-known tensioned spring assembly. The plunger head 203 is adapted to contact onto the shelf bracket 206 integral with the lever 59d, the adjustment of the nuts as 205 permitting pressure of the head 203 against the said bracket 206 sufficient to secure contact between the link 82d with its stop 189 in the shown full leftward position of the power rod 158, namely that of full brake release. The valve shown in Fig. 15 is meant to be connected to the brake pedal 15d at a suitable point on its upper arm above the bearing pin 16. As will appear from the description of the device in Fig. 15, the valve connection tends to return the pedal 15d with fair accuracy to its proper normal brakes-released position, namely that of the food pad 18 to the position shown in Fig. 1. This permits prevention of a surplus pedal bounce-back upon brake release, a factor previously referred to.

The operation of the device in Fig. 14 is mostly understandable from the description applying to Figs. 1 to 7 and Fig. 11. Instead of the pedal's lower arm 73d directly contacting the pin 58d, it acts thereon through the link 196. As to the brake pedal 15d retracting abnormally to its long-stroked position, as may be due to a leak in the vacuum motor or valve: Said gradual vacuum leak would cause the pin 65 to move gradually to the right, whereupon, after the lost-motion and after the master cylinder's compensating drilling covering by slight rightward movement of the master cylinder plunger 61, particularly after the lost-motion between 123d and 125d has been negotiated, all as previously explained, the pin 74 is forcefully moved leftwards thus revolving the pedal 15d clockwise on its fulcrum pin 16 for abnormal retraction. After the pin 188 has rocked with the pedal sufficiently upwards the toggle automatically collapses by downward movement of the pin 81d, with the result that the link 196 will rest and press on the bearing pin 199 for further and ultimate retraction of the brake pedal. Sufficient upward movement of the said pin 188 for secure collapse of the toggle can be assured by designedly having the pedal 15d retract a sufficient amount, so that the foot pad 18 assumes a position even rearward of the conventional long stroked pedals of current use, the leg convenience not being a weighty consideration because of the infrequency of the occurrence. Thereupon muscular application of the brakes is had through the connection through the link 196. Upon re-availability of the vacuum when the pedal 15d is in its abnormal long-stroked position, the pin 65 will be pulled to the left to its shown position in Fig. 14, during which operation the toggle linkage will tend to straighten out, its final straightening being aided by the spring 202. Moreover, as an assistance, the valve of Fig. 15 will tend to prevent the pedal 15d from depressing below the normal position of the foot pad 18 as shown in Fig. 1. This effect of the valve in Fig. 15 cooperating with the spring 159 will assure the shown checking contact between the radius lever 191 with its stop 194. An analysis of the forces would disclose that the spring 202 would aid in assuring contact between parts 191 and 194. It is optional to provide an elongated closed slot for lost-motion in the bearing of the link 82d over the pin 188, similar to the lost-motion slot 83 of Fig. 3, except that the slot should be closed to prevent disassembly of the link 82d from the pin 188. With such provision quantitative designing would provide that direct contact between the link 196 and the pin 199 would take care of the final supplemental braking through the movement of the foot pad from 18c to 18d (Fig. 1).

In Fig. 14 is furthermore disclosed an indicator in the form of a light bulb located preferably on the vehicle's instrument panel to give notice to the driver that the brake pedal is assuming its abnormal long-stroked position. It is particularly useful in combination with a form of accelerator disconnecting devices which do not affect accelerator disconnection automatically upon such abnormal retraction of the brake pedal, and as is disclosed in my application No. 399,908. Affixed beneath the foot board 17 is the fibre block 208 on which is mounted the conducting blade spring 209 bent so as to be in the path of the stud 210 affixed to and laterally projecting from the brake pedal 15d upon the pedal's abnormal retraction to its long stroke position. The conducting wire 211 electrically connected with the said blade spring leads to one terminal of the electric light bulb 212, preferably of the on-and-off flasher type as employed commonly for motor vehicle stop lights. The conductor 213 leads from the other terminal of the bulb to the switch 214, representing the ignition switch of the vehicle. Thence the conductor 215 leads to the battery 216, the conductor 217 thence leading to the ground. The other ground conductor 219 is shown as connected electrically to the brake pedal's bearing pin 16. After the ignition switch 214 is closed, retraction movement of the brake pedal will carry the stud 210 upwards for electrical wiping contact with the blade spring 209 thus closing the circuit through the battery 216 and the light bulb 212, illuminating the bulb, of any suitable color as red, to indicate to the driver that the brake pedal rests no longer at its normal low position. The bulb 212 is representative of any suitable form of indicator.

Figs. 15 and 16 show a combination of vacuum control- and check-valve for connecting to the upper arm of the brake pedal (see Fig. 17), as substitute for the valve 42 with its connections inclusive of the rod 95 (Fig. 1), and furthermore substitutes for the cushion spring 76 (Fig. 4), so that the parts 75 and 78 (Fig. 4) may be constructed of one piece. It serves the purpose of providing an optionally long valve operation stroke relative to the stroke of the brake pedal, and is pressure-indicated in the sense that it controls the vacuum valving according to the desired vacuum pressure in the vacuum motor 43. The check-valve portion has particular characteristics tending toward leak-proofness.

The fixed valve body 221 has symmetrically cylindrical axial bores therein of various diameters, a large bore establishing the exhaust chamber 222 (I speak of vacuum conveniently, as though it were a positive pressure) enclosed by the cap 223 retaining the cylindrically symmetrical metal partition 224 having multiple perforations as 225 leading into the filter material 226 cylindrically surrounding the partition, air inlet drillings as 227 being provided in the cap 223 to permit atmospheric air to course through the filter into the chamber 222. Integral with the cap 223 is the drilled guide cylinder 229 accommodating for axial sliding the lower end 230 of the valve stem comprising the cupped valve seating member 231. A tensioned compression spring 232 tends constantly to urge the valve member 231 rightward for valve closing pressure along its periphery on the annularly symmetrical diaphragm rubber 233, the inner lip of which fits snugly and may be cemented within the corresponding recess formed in the inner diameter of the cylindrical valve thimble 235, axially slidable in the smallest diametered bore of the valve body 221, and provided with several radially extending nibs as 236 to permit axial air passage and to guide the axial sliding movement of the thimble in the said bore. The thimble 235 has integrally the flange 238 adapted to checkingly contact and rest upon the adjacent shoulder formed in the valve body when the said thimble is in its rightmost axial position. The said thimble 235 is furthermore grooved away at its lower periphery so as to permit diaphragmatic flexing of the valve rubber 233, which rubber is held in the assembly by the flared upper end of the partition 234. The aforesaid smallest diametered bore of the valve body is annularly enlarged at its middle portion forming the continuously annular segmental boring 240 for enlarged air passage into the bore from the chamber 241 of the check-valve portion to be later described. The right end of the aforesaid thimble 235 has the integral continuously annular flange 242 of an outer diameter to enable it to pass through the aforesaid smallest bore of the valve body during assembly, under the peripheral edge of which flange is inserted the annular rubber seat washer 243 slightly overlapping the edge of the said small bore so that the said flange 242 may shearingly seat on said rubber washer for valve closure as is shown. The rubber washer or gasket 243 is surmounted by a thin metal washer to retain it in assembly, onto which metal washer bears the tensioned compression spring 245, the spring bearing at its right and movable end against the metal guide washer 246 surmounting the valve stem 247, which washer 246 itself bears rightward against the cupped metal diaphragm reinforcing plate 248 supporting the rubber diaphragm 249 held sealingly on the valve body by means of the cap 250 having the air passage drilling 251 therein and domed to accommodate the sphere 252 of the ball-joint element, which sphere is integral with the operating thrust rod 253. The right extremity of the valve stem 247 is shouldered to serve as rest for the metal washer 255, and is furthermore threaded to receive the ball socketing nut 256, which clamps the inner periphery of the rubber diaphragm 249 is assembly against the washer 255, which latter is hermetically sealed, during assembly, at its juncture with the stem 247 to obviate leaking. In the shown position the washer 255 forcefully bears against the cupped plate 248. It is apparent that there are two annular locations of diaphragmatic action of the rubber 249, the larger diametered at 258 and the smaller diametered at 259. The rubber diaphragm is to rest on the surface 260 when in its rightmost position and rests on the shoulder 261 of the valve body, when in its leftmost position. The compression spring 262 of stored tension bears on the valve thimble 235 and against the washer 246 and serves the purpose of urging the valve thimble 235 constantly leftwards for valve seating pressure against the rubber gasket 243. The spring 232 however securely dominates the tension in the spring 262.

The operating rod 253 extends rightward into the restricted guiding tube 267 for axial slidability therein, and during operation abuts against the axially slidable spring plug 268 adapted to be checked by the shoulder 269 formed in the spring enclosure casing 270 containing the tensioned compression spring 271 bearing at its left end against the said plug 268 and at its right end against the right wall of the spring enclosure tube 270 pivotally connected by means of the pin 273 to the brake pedal 15d or 15e (Fig. 17), which represents the upper arm of the brake pedal, as 15, the pin 273 being located a suitable distance upwards from the pedal's bearing pin 16. The tube 274 in free communication with the chamber 265 leads to the vacuum motor 43 (Fig. 1).

As to the check-valve structure, shown particularly in Fig. 16, the tube 40 leads to the engine's intake manifold 35 (Fig. 1), and is in free communication with the chamber 277 and by reason of the central perforation 278 in the rubber diaphragm member 279 is also in constant communication with the chamber 280 above the said diaphragm. The disc portion of the said rubber diaphragm is preferably reinforced by a metal plate embedded therein during its manufacture, as is shown in Fig. 16. The customary conical spring 281 lightly urges the diaphragm downwards to seat normally on the continuously annular and upstanding rim 282 for closing communication between the chamber 277 and the continuously annular chamber 241 in constant communication with the annular bore 240 within the valve body 221. The cap 283 held onto the valve body by screws or any suitable means sealingly retains the rubber diaphragm 279 in assembly and prevents atmospheric entry into the chambers, as conventionally with diaphragms.

As to the operation of the check-valve shown in Fig. 16: The valve is shown seated. Should the intake manifold suction existing in the tube 40, and chambers 277 and 280 exceed the suction pressure existing in the chamber 241, in communication with the control valve of Fig. 15, the surplus suction above the diaphragm 279 would raise the diaphragm off of the seating rim 282 and thus open communication between the chambers 277 and 241, thus causing surplus suction in the valve of Fig. 15. Should however the suction in the chamber 241 be of greater pressure than that of the chambers 277 and 280, the diaphragm 279 would be held firmly and sealingly on its seating rim 282 by reason of the large diaphragm area exposed to the chamber 241. It being optional to design the diaphragm of any quantity desired, it is apparent that perfect sealing can be attained on the smaller circumferential rim area of the seating rim 282. Furthermore such large exposed area has relation to the tension of the spring 281, thus reducing the pressure differential incurred by such valve springs, or alternatively permitting a more strongly tensioned spring for initial seating purposes. The feature of providing the communication hole 278 in the center of the diaphragm permits structure simplicity. The size of said hole 278 can be designed to obviate valve fluttering. The rubber at the seating rim may be soft for better sealing, particularly on a somewhat flat seating rim.

As to the operation of the vacuum control valve of Fig. 15: The parts are shown in the brakes-applied position, with the brake pedal 15d held depressed by the foot and immobile so that all valve ports are closed. However, as shown, the brakes are not applied with an overheavy braking pressure to tax the capacity of the power system, therefore vacuum suction exists in the valve which suction acts on the left side of the larger diametered rubber diaphragm 249, which is exposed to the vacuum suction existing in the vacuum motor 43. This type of compensating valve is one of balances between the various spring and suction forces. Should the brake pedal 15d be depressed leftwards still farther than is shown correspondingly extra tension would be given to the spring 271, thus disturbing the balance causing the valve stem 247 to move leftwards, with the consequent unseating of the valve member 231 off of the rubber 233, the valve thimble 235 being held virtually unmovable by reason of the seating of its flange 242 on the rubber gasket 243. Said unseating of the valve member 231 permits atmospheric air to enter through the filter 226, past the valve member 231 and through the axial hollow of the thimble 235 into the chambers 264 and 265 and consequently into the vacuum motor 43 in free communication with the said chambers. The resultant reduction of vacuum suction in the chambers 264 and 265 permits the diaphragm 249 to move compensatingly to the right as urged chiefly by the spring 245 and auxiliary by the springs 262 and 232, which rightward diaphragm movement carries the valve stem 247 with it by reason of the contact of the cupped plate 248 against the washer 255, thereby again closing the valve by seating the valve member 231 against the rubber 233. Such action accordingly is determined by the suction of the vacuum pressure in the chambers 264 and 265 and in the vacuum motor 43, the whole effect being initially determined by the tension in the spring 271 which tension depends upon the amount of foot depression of the brake pedal 15d. On the other hand, should the brake pedal 15d be permitted to retract slightly for the purpose of decreased braking pressure, the tension in the spring 271 would become decreased, with the result that the springs, such as 245 would force the whole assembly including the valve stem 247 to the right, which implies that the valve member 231 pressing on the rubber 233 which rests on the thimble or sleeve 235, would consequently force the said thimble 235 also to the right against the tension of the small spring 262, thus causing the flange 242 to become unseated from the rubber 243, consequently permitting the superior suction in the engine's intake manifold 35 (Fig. 1) to draw air from the chambers 264 and 265 and from the vacuum motor 43. This air would pass from the vacuum motor and said chambers through the valve opening at the flange 242, past the guiding nibs as 236 into the bore 240, thence into the chamber 241 and into the chamber 277 (Fig. 16), because with the superior intake pressure the check-valve would be opened, thence through the tube 40 into the engine's intake manifold 35. Such air suction from the vacuum motor 43 would increase the suction pull on the motor's diaphragm and thus reduce the braking pressure. Such increased suction in the vacuum motor and in the chambers 264 and 265 would act to force the rubber diaphragm 249 leftwards, thus permitting the then instant tension in the spring 271 to move the assembly including the valve stem 247 and the thimble 235 leftwards to again close the valve by seating the flange 242 onto the rubber 243. Thus again the tension in the spring 271 determines the vacuum suction in the vacuum motor 43.

As to the operation of the valve in Fig. 15, for full brake release: Removing foot pressure fully from the brake pedal 15d will permit the spring 271 to expand until the spring plug 268 rests upon the checking shoulder 269. Simultaneously the valve stem 247 and the valve thimble 235 will move to the right thus unseating the flange 242 from the rubber gasket 243 to introduce increased vacuum suction in the motor 43 to retract the brake system. The thimble 235 can move to its rightmost position, in which position the flange 238 integral with the thimble will rest on the shoulder of the valve body, the spring 232 being tensioned sufficiently not only to effect leakless seating on the rubber 232, but also having surplus tension, if so desired, to aid in supporting the weight of the brake pedal 15d which latter is optional and depends upon other optional factors in the complete design. It is meant, though not accurately shown in the drawing of Fig. 15, that the rubber diaphragm 249 rests on its stopping surface 260 on the cap 250 so as not to apply the pressure of the spring 245 against the washer 255 when the flange 238 of the thimble 235 rests on its adjacent checking shoulder of the valve body, therefore not exerting undue pressure between the valve member 231 and its rubber seating diaphragm 233. which rubber may optionally be made fairly soft for normal valve operation purposes. To accomplish such desired earlier seating of the rubber 249 on the cap rest 260 the stroke distance between the flange 238 of the thimble and the stop shoulder in the valve body against which it rests should be made longer than the stroke of the rubber 249 to its coacting seat. The area of the vacuum motor's diaphragm in relation to the actuating spring 69 (Fig. 1) might, for example, be designed so that about 12 inches of vacuum suction in the motor will fully release the brakes against the tension of said actuating spring. The combined tensions of the valve spring 245 and 262 would be designed to require more than such 12 inches of vacuum suction, we'll say 13 inches, to draw the rubber diaphragm 249 away from its resting position against the valve cap 250. Surplus initial tensioning to compensate for such 1 inch differential pressure may be provided in the spring 271, if desired. On the other hand it is not objectionable that the combined tensions of said springs as 245 be less than the moment equivalent of 12 inch vacuum suction requirement to operate the diaphragm 249; in such case however there would be no proper valving for the very initial pressure braking, as might be desired for icy roads. Furthermore, since gasoline engines in good condition supply about a maximum of 20 inches of vacuum suction, it is apparent that, when the brakes are in release during such suction conditions, the diaphragm 249 would be drawn to the left until its supporting plate 248 rests on the rim 261 of the valve body. When thereupon applying the brakes through pedal depression, the very initial valve operation would instantly eliminate the surplus suction in the vacuum motor, permitting the diaphragm 249 to move promptly rightward for control contact with the washer 255. It is apparent that the diaphragmatic action of the rubber 249 for its diaphragmatic radius to the point 259 permits the diaphragm 249 to rest leftward on the rim 261, as aforesaid, while permitting the stem 247 with its attached parts to remain in its rightmost position for retaining the valve closed. The purpose of providing a stop shoulder 238 on the thimble 235 is to permit the full surplus force of the spring 232 to press for valve closing between the valve disc member 231 and the rubber 233 for better leaklessness, whereas during the actual valve operation, and in the position shown, the tension of the spring 262 determines the valving pressure or seal at the valve seats. The said flange 238 is accordingly optional. The choice of tension variation of the spring 271 per stroke obviously determines the normal valving stroke of the pedal's foot pad 18. For example, if the pivot pin 273 is located halfway down from the pedal pad 18 in respect to the pedal's fulcrum pin 16, and if designedly a total of 1 inch pedal depression stroke at the foot pad 18 is desired for the whole power control of valving operation, the spring 271 should be designed for a tension variation so that ½ inch of its compression increases its tension to an extent to fully carry the load of the springs as 245, because at that stage of the pedal's depression it is desired to reach zero vacuum suction in the vacuum motor 43 thus eliminating any suction aid to hold the diaphragm 249 leftward to its shown operative position. Upon still further pedal depression beyond such assumed 1 inch stroke, the range of muscularly supplementing the power system will begin, involving that the valve stem 247 and the valve member 231 will move still farther leftward than is shown in Fig. 15 until the plate 248 rests on the rim 261 to determine the limit of the leftward movement of the valve stem 247, during which condition naturally the member 231 will be raised off of the rubber 233 holding the valve open. The extra length of the spring 271 will permit the foot pad 18 to reach all the way to the foot board 17 during such muscular supplementing of the power. Said extra compression of the spring 271 will exert an extra load on the foot, which however is not meant to be impractical, since the total foot work for normal valve operation is to be suitably light. On the other hand provisions are known to minimize such extra foot load by providing an additional spring in series with the spring 271, such extra spring being checked against a shoulder as 269 for the spring 271 for suitably heavy initial tensioning and having a long stroke per tension variation. The amount of initial tensioning of the spring 271, namely its stored tension when the spring head 268 rests upon the shoulder 269, is optional. It may be designed sufficient so that the spring 271 does not compress during the initial valve operation; or it may be designed for slight compression initially to meet the load of valve operation, thus making the pedal less sensitive for such initial operation, in other words permitting a cushioning depression before operation of the valve. The said amount of initial tension of the spring 271 is attained by the location of the check shoulder 269. For convenient reasons I have omitted threaded adjustments in the drawings for spring tensions and for connecting rod lengths. The length of the guide tube 267 in which the rod 253 axially slides should be sufficient to permit the brake pedal to assume its abnormal long stroke position.

Some special features, otherwise perhaps overlooked, in the valve structure of Fig. 15 might be noted. The braking pressure modulation movement of the thimble 235 is very small, since the valving at the rubber 233 occurs almost instantly after the thimble 235 has been brought to rest on the rubber 243, thus almost simultaneously opening one valve after the closure of the other upon a continued movement of the valve stem 247. It so operates also reversely. To enhance valve responsiveness still further I provide that the vacuum suction existing inside of the valve does not substantially affect in its fluctuations the moving valve members, except for the intended effect of the suction on the rubber diaphragm 249. For this reason, the effectual area of the diaphragm radiused to its flexing portion at 259 approximately equals the area of the valve member 231 for mutual equalization, thus removing suction pressure influence on the valve stem 247. Moreover, the effectual diaphragmatic area of the rubber 233, radiused to its flexing circle approximately equals the cross-sectional area of the small bore in the valve body 221, in other words about equals the area of the valve circle at the rubber 243, and also approximately equals the area of the valve member 231 for its seating on the rubber 233 and therefore almost completely eliminates influence of suction either in the main chamber 265 or in the chamber 240 from having axial force effect on the thimble 235. Furthermore, the vacuum pressure differential existing between the chambers 240 and 265 is equalized to all lateral portions of the thimble, thus removing resistant friction (also consequent wear) between the thimble 235 and the valve body during the valve operation, such suction pressure differential being large upon full valve opening, namely when the suction in the chamber 265 is reduced to zero. Moreover, the valving orifices are linearly long extending for the full periphery of the valve member 231 and of the flange 242, thus permitting copious flow per valve movement, while at the same time providing sensitive checking of undue flow by reason of the prompt responsiveness of the diaphragm action of the rubber 249 enhanced by the differential dynamic pressure of flow between the main chamber as 265 and the vacuum motor, with the time elapse required to equalize the pressure at static. Such factors of valving responsiveness count for reduced foot work with equal braking pressure modulation; or inversely, for better braking pressure modulation with equal foot work. The three springs inside of the valve body 221 have a short operative range, and if designed for a maximum stress safely below the elastic limit with proper margin, would endure indefinitely, except for possible corrosion, in view of the number of operations during the life of the valve.

If it be preferred not to load the spring 232 with the extra load of the weight of the brake pedal, an additional spring assembly identical to the parts 253 rightward to the pin 273 may be pivoted to the brake pedal, just as is pin 273, with the left end of the rod 253, however, pivoted on a fixed pin. The tension of the spring, supplanting the spring 271, should then be lighter than that of 271.

Supplemental explanations

It should be observed that the leverage is changed also advantageously for the power actuation, in the sense that contact between the lower pedal arm 73 (Fig. 1) with the pin 58 during the brake pedal's power-supplemental over-depression when the pedal pad 18 reaches the point 18c, would switch the fulcrum for the spring actuation of the lever 59 from the pin 74 to the pin 58, establishing, for example, double the leverage advantage for the actuating spring 69 for braking effect. Such transition would be gradual with the switch of load from the pin 74 to the pin 58 while both are in contact, and as is registered in a corresponding gradual resistance to the foot and is therefore practically controllable because of such increase in foot resistance. Should the power system, comprising the vacuum motor and the spring 69 be designed of a capacity to take care of the full range of all normal pressure braking, the non-reverse lock means shown in Figs. 8 to 13, may optionally be dispensed with, since said fulcrum switching at point 18c might be considered satisfactory for taking care of the exceptional conditions when heavier than such normal braking pressure be required, as might be dependent upon the condition of the brake linings. It should be remembered that contact of the arm 73 and the pin 58 when the pedal pad has depressed down to the point 18c is meant to occur preferably when the brake linings are worn to an extent to advise readjustment of the brakes. Accordingly with less lining wear said contact and fulcrum switching would occur before the pad 18 reaches the point 18c. The substitute lever system shown in Fig. 14 affords a greater margin for such quantitative designing, particularly with certain existing chassis structures of some vehicles. Incidentally, as is shown in Fig. 3, some initial lost-motion is preferably provided between the pedal's arm 73 and the pin 58, when the brakes are in release. This lost-motion permits valving initiation without a simultaneous heavier load on the foot. If however it be desired to provide a sturdier resistance for the pad 18 initially, the arm 73 may be designed to contact the pin 58 for the shown full brake release position shown in Figs. 1 and 3.

It should furthermore be observed that the foot force leverage through the pin 74 under the condition that the foot muscularly supplements the power system with the non-reverse lock devices such as Fig. 8 effective, is of such quantity, particularly if the pedal designedly has light resistance for light foot pressure for normal braking, that the hydraulic brake system can readily be abused with heavy over-pressure, should the foot for any incidental reasons press over-heavily on the foot pad 18. To prevent such abuse, the overload-relief device for the hydraulic brake system, as disclosed in my application numbered 404,688 may be provided. It is apparent, however, that such extra provision would not be required, if the lock devices shown in Figs. 8 to 13 were omitted, as assumed in the preceding paragraph above, provided that the capacity of the power system when operating on the pin 58 as a fulcrum is not sufficiently large to involve such abuse to the hydraulic brake system. Moreover, it is optional, of course, to provide stronger structure for the hydraulic brake system. And the assumption herein, of course, applies to heavier vehicles involving and requiring a heavy leverage change in my specific device.

Moreover, with a designedly light pressured brake pedal for heavier vehicles, the thermal expansion of the brake drums incidental to heavy pressure braking would tend to gradually lower the pedal or foot pad 18 towards the foot board 17, during the muscular supplementing of the power system, particularly in some vehicles. The speed of approach of the pad 18 to the foot board would be checked upon contact of the pedal's lower arm 73 with the pin 58, for the dual reasons of the change in leverage moment, and of the power system comprising the spring 69 resuming the work of further brake applying movement, as previously described. However, it is optional to employ in combination with the disclosed device my thermal compensation device disclosed in my application 404,688, which supplies extra hydraulic brake fluid to the brake system in ratio roughly to the temperature of the brake drums.

From the description of the effect of the pivoting of the valve rod connection at the point 96 (Fig. 3) instead of on the pin 74, it becomes obvious that the depression of the brake pedal 15 can be made to follow-up the movement of the lever 59 with fair closeness so that not much extra pedal depression is required for the transition period for the pedal's lower arm 73 to contact the pin 58.. This is provided by locating the point 96 the appropriate distance above the pin 74; and with such provision it seems preferable to omit the cushion spring 76 (Fig. 4), or by decrease of its pedal stroke effect. It should be observed furthermore that elimination of the cushion spring 76 in favor of the provision of locating the point 96 non-coincident with the pin 74, would serve to retain the brake pedal approximately at one point (18c) of its depression during the described switching of the power fulcrum from the pin 74 to the pin 58, with its involved braking pressure increase through power action during the gradual transition, provided that the point 96 be not located so high over the pin 74 so as to provide a close follow-up of pedal depression in relation to the movement of the lever 59, thus not involving further pedal depression during such transition in order to keep the valve open for free power operation. Thus an optional quantitative design range is left to the engineer.

The brake and accelerator pedals are preferably disposed laterally close together, such as by extending the brake pedal pad 18 towards the accelerator pedal, so as to require less lateral heel-rock for foot transfer. Incidentally, it is noted that the pedals are independently operable as usual, serving for one thing not to confuse the beginner. The rubber bars, such as 116 of Fig. 8, are preferably slightly axially tapered conically so that lateral pressure of the rubber against the adjacent friction shoes is initiated at the rubber end adjacent to the part 105, thence progressing towards the part 109. The hydraulic brake communication system may be made less resistant for quicker liquid flow for brake application, such as by enlargement of the orifices, over that of the conventional hydraulic brakes. At the same time, to compensatorily restrict the back-flow of brake liquid into the master cylinder for the conventional "pumping" efficiency purposes, the known by-passing check-valve provision may be inserted in the main brake line directly connecting with the master cylinder, permitting more copious liquid flow to the wheel cylinders than the flow back to the master cylinder. As substitute for the retract spring 124 (Figs. 1 and 14), the vehicle's brake shoe retract springs, as 133 (Fig. 1) may be designed of sufficiently strong tension so as to predominate in its reaction force for securely retracting the brake pedal to its abnormal long stroke position; the retarded backflow of brake liquid to the master cylinder affording time for the operation of the vacuum motor, to prevent the surplus back-bounce of the brake pedal, previously referred to.

The force communication system for my invention may be partly of hydraulic nature instead of the shown mechanical. Therefore, the term "connection," as used in the claims, may well be the joining of one body of liquid to another, such as a hydraulic branch. Moreover, a "connection" generally may involve mere contact surfaces between elements, or it may involve an intervening train of members, with or without incidental connections or accessory devices in such train. Since we are chiefly concerned with the conveyance and defined interaction of forces, for which various suitable instrumentalities are known in engineering, the claims are not to be interpretatively limited to the particular structures disclosed in this chosen representative embodiment of my invention, except as becomes apparent. The term "pedal" implies any suitable foot operable element, and need not be a pivoted lever, as an example. Moreover, some claims may involve a permissible over-lapping of elements.

Having thus described my invention so that one properly versed in the art may intelligently make and use it, to the appropriate extent of its potentialities for the various conditions and purposes indicated, I claim:

1. In a brake system, an element reciprocable for brake application and release, power means arranged to reciprocate the element, a pedal adapted to control the means, a fulcrum for the pedal, a 3-point floating lever interconnecting the pedal, element and means differentially, structure movably supporting the lever from the fulcrum, an additional alternative connection between the pedal and lever for an alternative pedal-to-element leverage ratio, and means adapted to effectually disconnect one of the pedal connections to establish the effectiveness of the other connection.

2. In a brake system, an element pressable for brake application, a limited-force power means adapted to press the element, a pedal adapted to control the means, and force communicating connections between the element, means and pedal whereby the pedal is adapted also to press the element, said connections comprising force ratio changing means arranged to give substantial supplemental force ratio advantage to the power means for effectual braking upon full depression of the pedal.

3. In a brake system, an element pressable for brake application, power means, a pedal adapted upon its normal depression to control the means, lever means wherethrough the power means presses the element for pressure braking, and leverage ratio changing means arranged so that an overnormal depression of the pedal switches the fulcrum and resultantly the force ratio in the lever means, directionally to give substantially greater than normal force advantage to the power means for braking actuation.

4. In a brake system, an element movable for brake application, power means adapted to move the element, a pedal arranged for a normal low and for power-failing long stroke positions of brake release and adapted in its low position to control the power means, a connection between the pedal and element adapting the pedal in its long stroke condition to self-sufficiently apply the brakes, a further alternative toggle-link thrust connection arranged to give lighter pedal pressure requirement in ratio to the element during said normal low condition, and means causing collapse of the toggle-link connection upon the pedal's retraction to its long stroke position.

5. In a vehicular brake system, power means arranged to apply and release the brakes, a brake pedal with means giving the pedal a normal low and short-stroke position of full brake-release for cooperation with the power means, means whereby the pedal is automatically positioned to an abnormal, higher and long-stroke position of full brake-release upon failure of the power means, and resilient pedal retract means arranged to limitedly retract the pedal to its normal low position upon brake release when the power means is in its normal efficacious condition.

6. In a brake system a power actuator adapted to apply the brakes, a muscularly operable controller differentially associated therewith so as to be adapted also to apply pressure for braking, and checking means adapted to retain the actuator against reverse yielding to predominant force from the controller including a relatively fixed member of longitudinal length, member-engaging means arranged for substantial co-movement with the actuator along the length of the member, and means whereby force from the controller is directed to cause said engaging means to become retained against the member.

7. In a vehicular brake system a brake operator comprising a power actuator connected to apply the brakes, a brake pedal differentially associated therewith, and checking means adapted to retain the actuator against reverse yielding against predominant force from the pedal including a relatively fixed member, expansible means associated therewith and arranged for substantial co-movement with the actuator, tensioned resilient means adapted to initially expand said expansible means retentionally against said member and means whereby force from the pedal increases the expansive force in the expansible means.

8. In a vehicular brake system a brake operator comprising a power actuator adapted to apply the brakes, a brake pedal mutually reactionally associated therewith and arranged to control the actuator, checking means adapted to lock the actuator against reverse yielding to predominant force from the pedal, which means comprises a substantially fixed tube, friction shoe means disposed slidably adjacent the inner wall thereof and arrangegd for co-movement substantially with the actuator and a fluidly yieldable element within the shoe means adapted upon its lateral expansion to retentionally press the shoe means against the tube by tube-axially directed compressive force from the pedal onto the yieldable element, and means whereby force from the pedal compresses the yieldable element.

9. In a brake system, a brake operator comprising power motor means to release the brakes and having a longitudinally reciprocating force communicating element, a tube affixed to the motor means through which the element is axially movable, an actuator compression spring mounted surrounding the tube and connected with the element functionally beyond the tube to apply the brakes, and a muscularly operable controller differentially connected with the above combination so as also to pressure apply the brakes, the element and tube combination including means adapted to lock the element to the tube which means is operable upon preponderance of force from the pedal.

10. In a self-propelled vehicle having brakes, tensioned resilient means arranged to apply the brakes, power motor means arranged to oppose the first means and to release the brakes, a brake pedal adapted in its normal low position to control said dual means combination, means adapted to cause an abnormal retraction movement of the pedal to a longer stroke position for releasing the brakes upon operative failure of the power motor means to release them and further to condition the pedal for subsequent muscular application of the brakes in lieu of the powered combination, and electrical indicator means operative upon the pedal's movement to the longer stroke position to indicate the abnormal retraction condition of the pedal.

11. In a self-propelled vehicle having brakes, power means connected to operate the brakes comprising tensioned resilient means adapted to pressure apply the brakes and fluid power motor means adapted to release the brakes and to restore the tension in the resilient means, a valve for the motor means, and a driver-operable brake controller arranged to control the valve, the valve having a chamber expansible responsively to the differential pressure in the motor means in respect to atmospheric and associated with the controller so that the effectual brake applying force is proportioned to the driver's muscular force applied to the controller.

12. In a self-propelled vehicle having brakes, suspended resilient force means adapted to pressure apply the brakes, fluid power motor means arranged opposed to the resilient means for forcefully retaining the brakes released, a fluid power source with communication duct to the motor means, and a check-valve in the duct cooperatively associated to maintain brake-release-retention fluid force in the motor means, which valve comprises a flexible diaphragmatic element arranged exposed on its opposite sides to the differential pressures of the source and of the motor means and a valve sealing member operable by the diaphragmatic element and arranged of an effective valve seating area substantially smaller than the effective area of the element.

13. In a vehicular brake system, limited-force power means adapted to apply the brakes, a brake pedal, interconnecting means whereby the pedal controls the power means and is adapted further to supplement the power means for higher pressure braking making the pedal subject to further travel towards the vehicle's floor-boards as conventionally during such supplemental operation, and uni-directional force-flow means whereby the braking work already accomplished by the power means is retained during the supplemental braking by the pedal, the connecting means being so arranged that the momentary retraction of the pedal during such supplemental braking permits further brake-applying-directional operation of the power means resulting in a new and more retracted effectual position of the pedal preparatory to further supplemental braking by the pedal.

14. In a vehicular brake system, restrained stored energy means adapted to apply the brakes, fluid power motor means arranged opposed to the said stored energy means to release the brakes and having an operatively movable element therefor, valve means sealing the fluid in the motor means to prevent operation of the energy means while the brakes are to be held in release, a driver-operable controller for the power motor means to apply the brakes, and valve-leak indicator means adapted and disposed to become operable early upon the brake-applying-directional movement of the element caused by valve-leak, including means arranged to prevent operation of the indicator means during the normal controller-directed brake-applying-directional movement of the element.

15. In a brake system, power means with connection normally to apply the brakes, a muscularly operable controller adapted to control the power means and to actuate the brakes upon failure of the power means, the controller having normally a short stroke from its full brakes-released position, interconnection means including fulcrum-switching force ratio changing structure adapted to retract the controller to an abnormal full brakes-released position for a substantially longer muscular actuation of the controller and consequent brake application as substitute for failing power, and means whereby effectual failure of the power means operates the interconnecting means for said retraction of the controller.

16. In a vehicular brake system, an element movable for brake application, power means arranged normally to move the element, a foot pedal adapted to control the means and arranged to actuate the brakes upon failure of the power means, mutually reactive differential interconnections between the pedal, element and means arranged for operation during at least the normal range of pressure braking by the power means and comprising a ratio-changing structure of a duality of alternative force paths from the pedal to the element for ratios of respectively lighter and heavier reactive pressures from the element against the foot operating the pedal, and means whereby the effectually operative condition of the power means conditions the ratio-changing means for the lighter reactive pressure from the element against the foot.

17. In a brake system, power means adapted normally to apply and release the brakes, a pedal for controlling the power means and for self-sufficiently actuating the brakes upon failure of the power means, second means adapted to cause the pedal to assume an alternative duality of full brake-released positions for respectively longer and shorter operative pedal strokes, connections whereby the pedal controls the power means at least during the short-stroked operation, and connections whereby the pedal becomes conditioned for self-sufficient actuation of the brakes during its longer stroked operation, the said second means arranged to position the pedal for its longer stroked operation upon the operatively failing condition of the power means.

18. In a brake operating system, an element pressable for pressure braking, a brake pedal, means adapted to cause the pedal to assume either of an alternative duality of full brake-released positions for respectively longer and shorter operative pedal strokes, including a connection between the pedal and element whereby the pedal communicates pressure thereto and structure giving a duality of alternative paths for such pressure communication, and means whereby the respective paths become conditioned for subsequent operation automatically upon the pedal's retraction to its respective longer or shorter stroke positions of brake release.

19. In a brake system, a member movable for braking, a powered actuator, a driver-operable actuator, mutually reactive differential interconnections between the member and the two actuators whereby the actuators react mutually and concurrently apply braking pressure to the member, and checking means adapted to restrain the powered actuator from yielding to predominant force from the other actuator, comprising a substantially intrinsically rigid element having two substantially equi-distant opposite faces of substantial length, and a therewith cooperatively associated second element disposed to slide relatively along the length of the first element in adjacency to its said two faces and constructed so that the tilting of the second element relative to the first element causes it to lock itself onto the faces of the first element, and limited force means adapted to oppose such tilting, one of said two elements being substantially fixedly anchored, and the other element connected substantially co-movably with the powered actuator, directionally so that the tilt locking between the elements prevents the powered actuator from yielding against its force direction.

20. In a vehicular brake system, an element resistantly movable for brake application, which element has an initial relatively long but less resisting brake-applying movement for taking-up brake slack and has a further relatively shorter but more resistant brake-applying movement for effective pressure braking all as conventionally, tensioned spring means connected to cause the said combined movements, power motor means connected opposed to the spring means to cause the brake-release operation of the element and to re-energize the spring means, power dispensing means, a control pedal to variably control the dispensing means and resultantly the braking, structure whereby the braking force through the element is substantially reactively registered against the foot operating the pedal, and connecting means between the pedal and dispensing means so arranged and associated with the several parts that the pedal's normal power-controlling depression movement substantially corresponds to the foot pressure on the pedal and to the braking force on the element and is substantially disproportioned to the movement of the element.

BERNARD HY. MOSSINGHOFF.